(12) United States Patent
Pitbladdo

(10) Patent No.: US 8,156,766 B2
(45) Date of Patent: Apr. 17, 2012

(54) MOLTEN OPTICAL GLASS FINING APPARATUS

(75) Inventor: Richard B. Pitbladdo, Naples, FL (US)

(73) Assignee: Corning Incorporated, Corning, NY (US)

( * ) Notice: Subject to any disclaimer, the term of this patent is extended or adjusted under 35 U.S.C. 154(b) by 874 days.

(21) Appl. No.: 11/551,770

(22) Filed: Oct. 23, 2006

(65) Prior Publication Data

US 2007/0084247 A1   Apr. 19, 2007

Related U.S. Application Data

(63) Continuation-in-part of application No. 10/745,082, filed on Dec. 23, 2003, now Pat. No. 7,150,165.

(60) Provisional application No. 60/771,642, filed on Feb. 9, 2006, provisional application No. 60/438,875, filed on Jan. 9, 2003.

(51) Int. Cl.
*C03B 5/182* (2006.01)
*C03B 5/20* (2006.01)
*C03B 5/225* (2006.01)

(52) U.S. Cl. .............. 65/346; 65/347; 65/135; 65/135.2

(58) Field of Classification Search ............ 65/346–347, 65/335, 157, 134.2, 134.1, 134.9–135.3
See application file for complete search history.

(56) References Cited

U.S. PATENT DOCUMENTS

| | | |
|---|---|---|
| 1,564,235 A | 12/1925 | Harrington |
| 1,598,308 A | 8/1926 | Pike |
| 3,420,653 A * | 1/1969 | Boettner ........................ 65/335 |
| 4,029,489 A | 6/1977 | Froberg |
| 4,184,863 A | 1/1980 | Pieper |
| 4,195,982 A | 4/1980 | Coucoulas |
| 4,704,153 A | 11/1987 | Schwenninger |
| 4,738,938 A | 4/1988 | Kunkle |
| 4,780,122 A | 10/1988 | Schwenninger |
| 4,849,004 A | 7/1989 | Schwenninger |
| 4,906,272 A * | 3/1990 | Boettner ........................ 65/346 |
| 4,919,697 A | 4/1990 | Pecoraro |
| 4,919,700 A | 4/1990 | Pecoraro |
| 4,994,099 A | 2/1991 | Boettner |
| 5,316,563 A | 5/1994 | Ishimura |
| 5,433,765 A * | 7/1995 | Muniz et al. .................... 65/178 |
| 5,573,569 A * | 11/1996 | Sorg et al. .................... 65/135.1 |
| 5,609,661 A * | 3/1997 | Moreau et al. ............... 65/135.1 |
| 5,630,860 A * | 5/1997 | Sorg et al. .................... 65/135.1 |
| 5,785,726 A | 7/1998 | Dorfeld |
| 5,849,058 A * | 12/1998 | Takeshita et al. ............ 65/134.2 |
| RE36,082 E | 2/1999 | Ishimura |
| 6,119,484 A * | 9/2000 | Takei et al. .................. 65/134.2 |

(Continued)

*Primary Examiner* — Matthew Daniels
*Assistant Examiner* — Jodi C Franklin
(74) *Attorney, Agent, or Firm* — Siwen Chen

(57) ABSTRACT

The present invention significantly modifies the currently known fining apparatus (finer). The basic shape is changed from a cylindrical shape to an elliptical shape, a somewhat rectangular shape, variations on a gabled roof shape, or variations on a gothic arch shape, such that the flow is more uniform and the seeds have less distance to rise to the surface. Baffles of a novel design are optionally included in an embodiment of the present invention to further increase fining performance. Prior art baffle designs are optionally included in an embodiment of the present invention to trap seeds and serve as structural elements. The present invention improves the fining capability of the apparatus without increasing the cost of construction materials. In fact, the cost would be reduced for the same fining performance by shortening the length of the finer.

39 Claims, 38 Drawing Sheets

U.S. PATENT DOCUMENTS

| | | |
|---|---|---|
| 6,286,337 B1 | 9/2001 | Palmquist |
| 6,294,005 B1 | 9/2001 | Inoue |
| 6,318,126 B1 | 11/2001 | Takei |
| 6,321,572 B1 | 11/2001 | Takei |
| 6,332,339 B1 | 12/2001 | Kawaguchi |
| 6,334,336 B1 | 1/2002 | Takei |
| 6,401,492 B1 | 6/2002 | Nattermann |
| 6,405,564 B1* | 6/2002 | Takei et al. ............... 65/157 |
| 6,460,376 B1 | 10/2002 | Jeanvoine |
| 6,536,238 B2 | 3/2003 | Kawaguchi |
| 6,854,290 B2 | 2/2005 | Hayes et al. |
| 6,948,338 B2 | 9/2005 | Sakai |
| 7,007,514 B2 | 3/2006 | Sakai |
| 7,134,300 B2 | 11/2006 | Hayes |
| 7,150,165 B2* | 12/2006 | Pitbladdo ............... 65/346 |
| 2001/0045107 A1* | 11/2001 | Chenoweth ............... 65/134.6 |
| 2002/0000101 A1* | 1/2002 | Chenoweth ............... 65/135.1 |
| 2003/0037572 A1* | 2/2003 | Dick et al. ............... 65/134.9 |
| 2003/0230117 A1* | 12/2003 | Jochem et al. ............... 65/346 |
| 2004/0134235 A1* | 7/2004 | Pitbladdo ............... 65/346 |
| 2005/0160769 A1* | 7/2005 | Sakai et al. ............... 65/346 |
| 2005/0229637 A1 | 10/2005 | Hamashima |
| 2005/0268663 A1 | 12/2005 | Tomita |

\* cited by examiner

Figure 3D
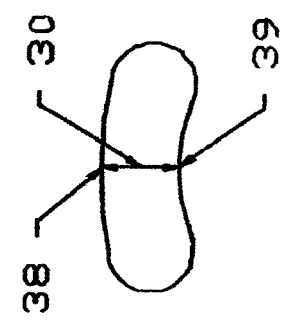
Figure 3H
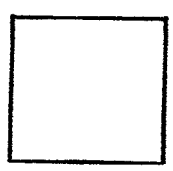
Figure 3C
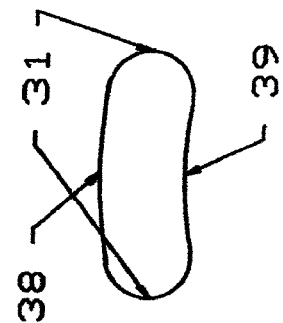
Figure 3G
Figure 3B
Figure 3F
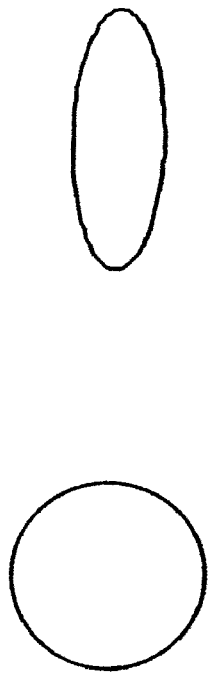
Figure 3A
PRIOR ART
Figure 3E

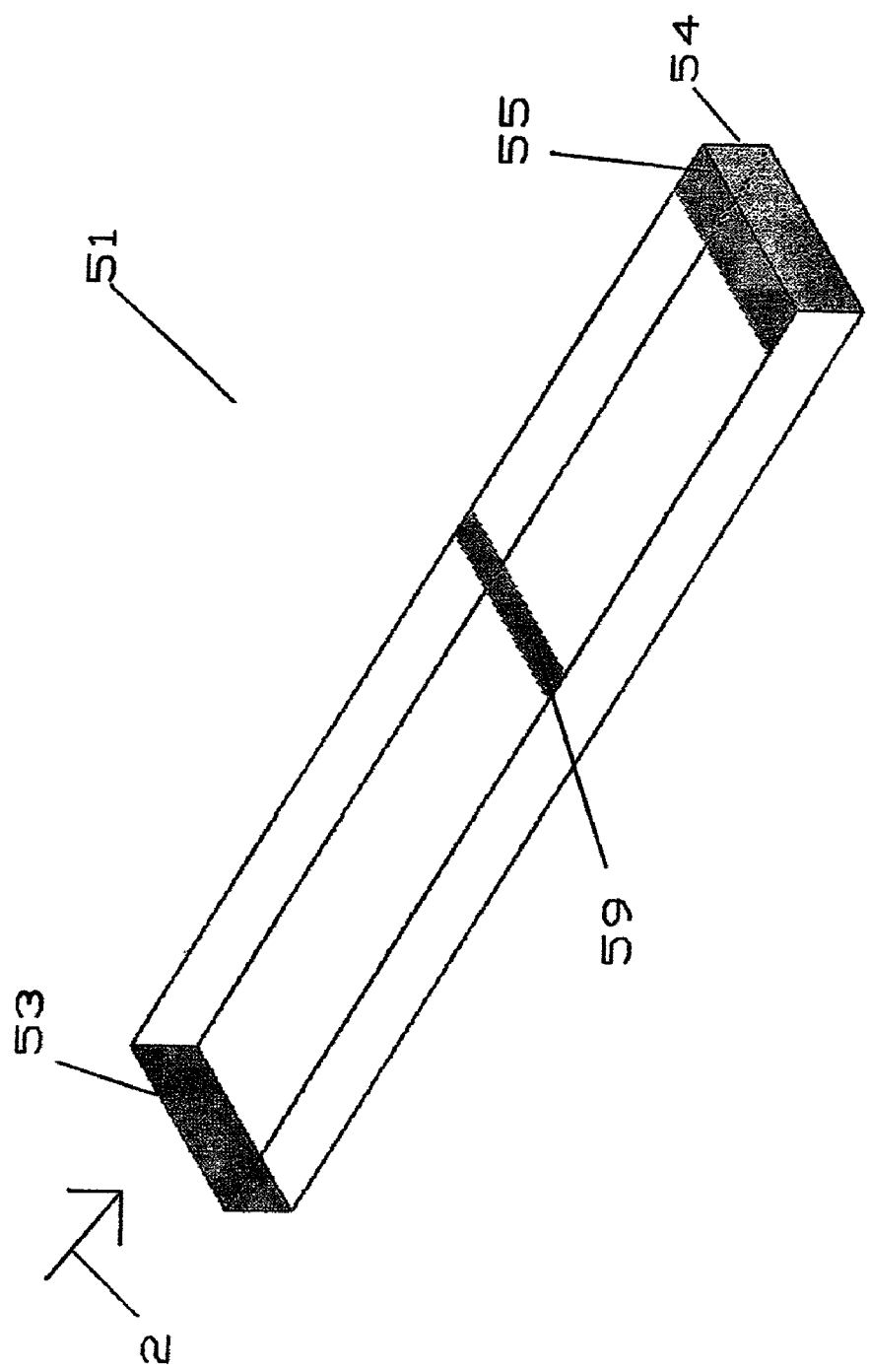

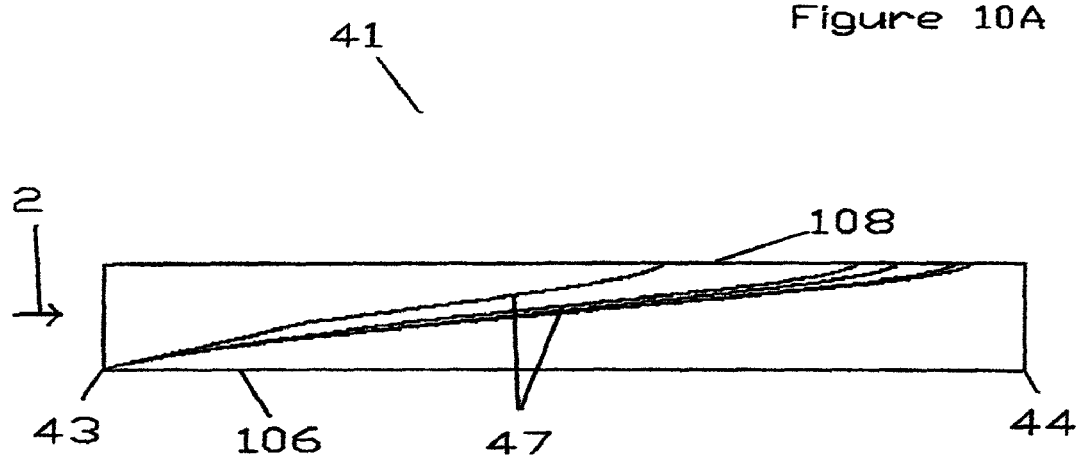
Figure 10A
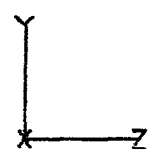
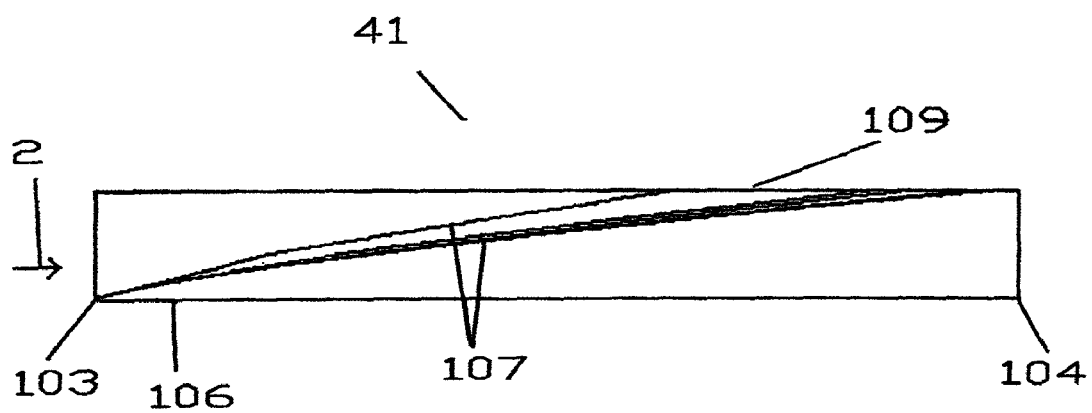
Figure 10B
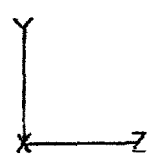

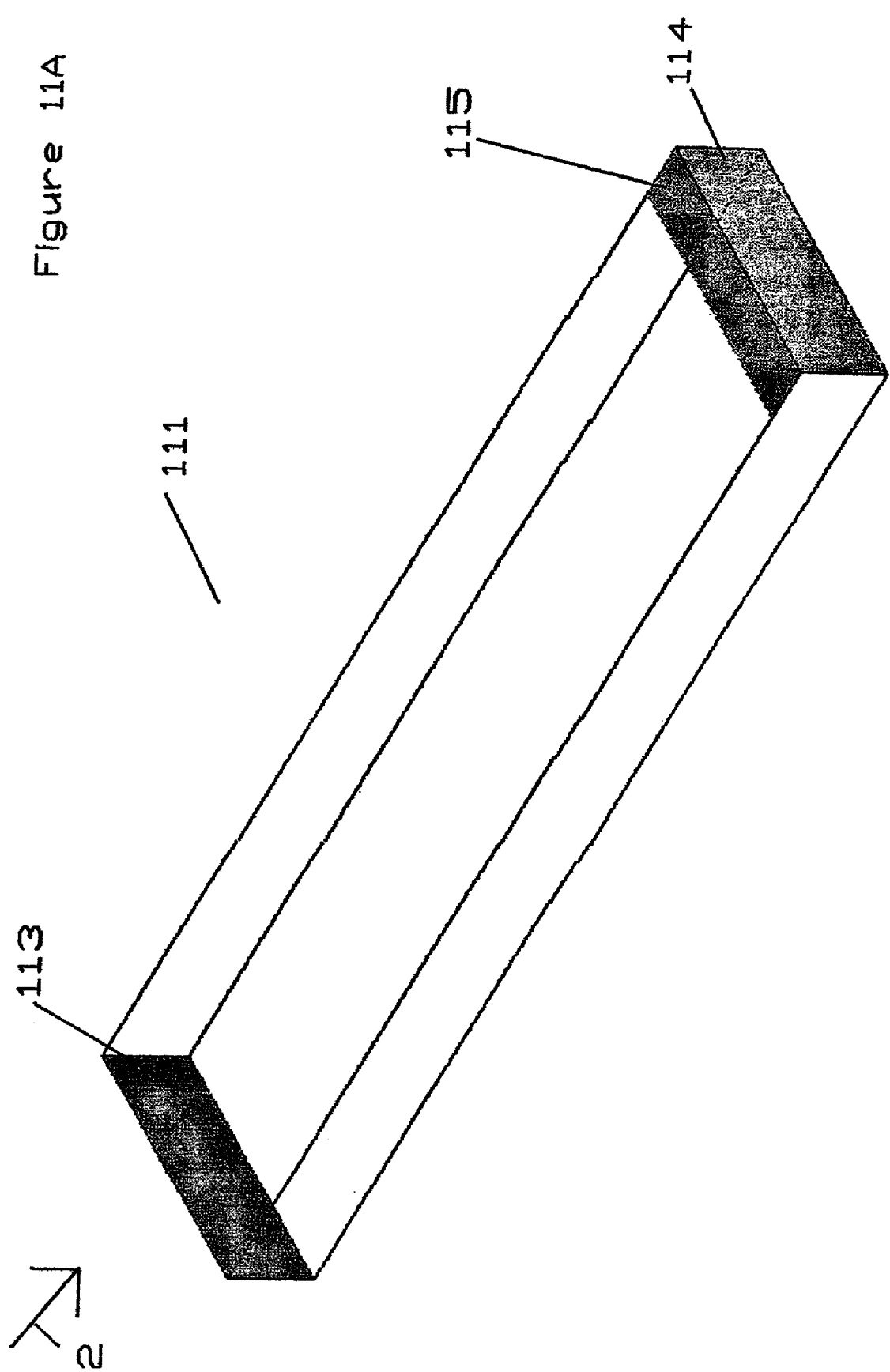

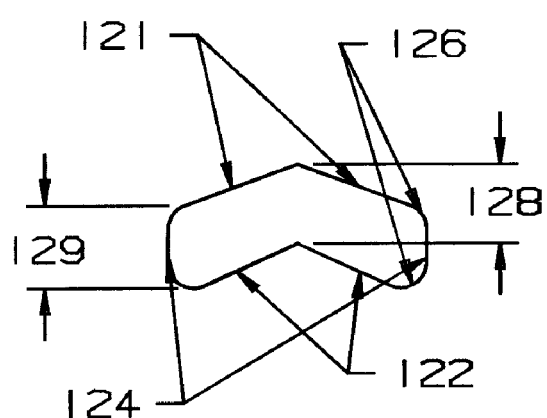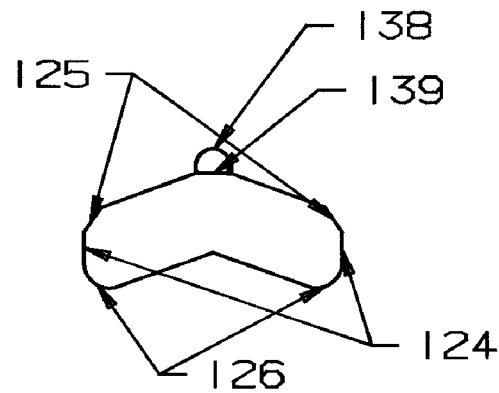
Figure 12E        Figure 12F
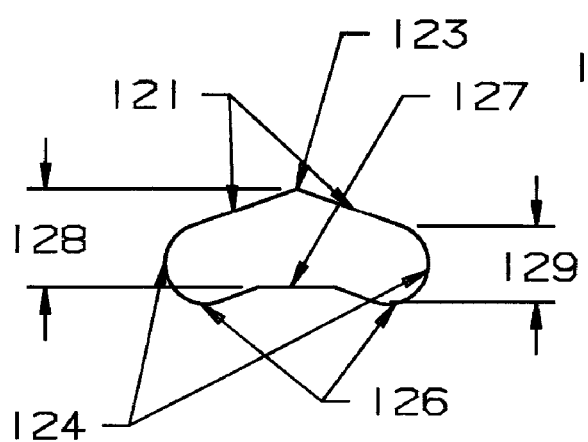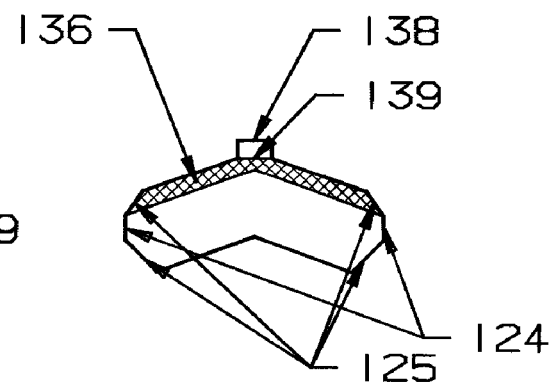
Figure 12G        Figure 12H

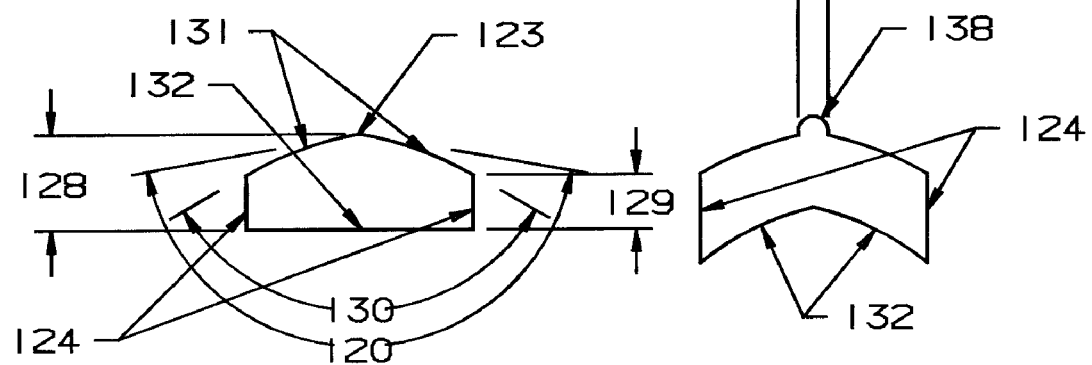
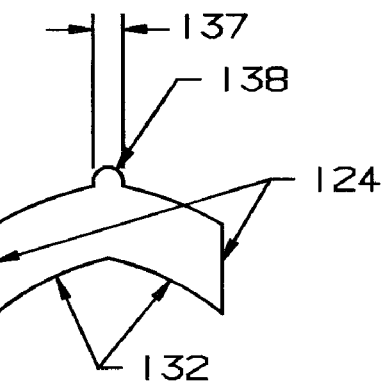
Figure 13A    Figure 13B
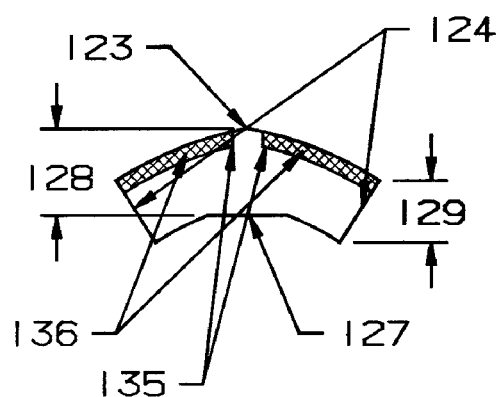
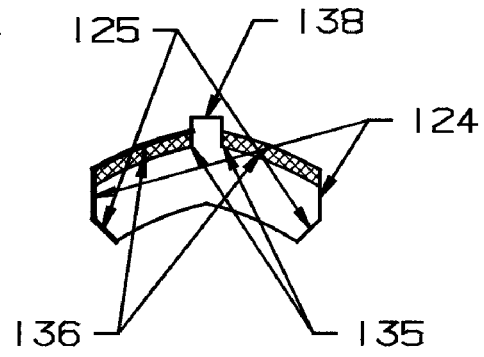
Figure 13C    Figure 13D

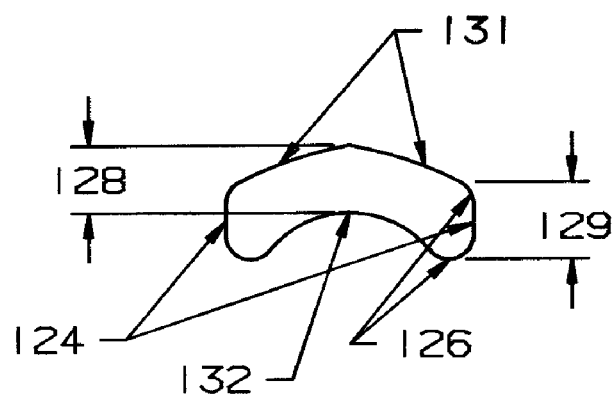
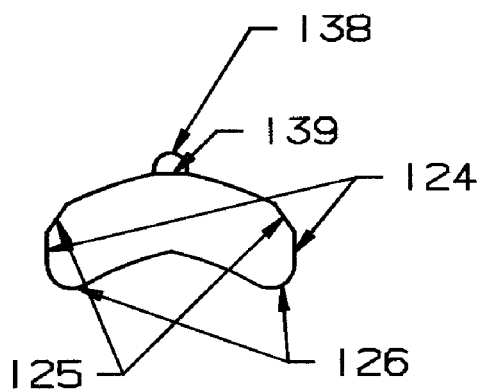
Figure 13E    Figure 13F
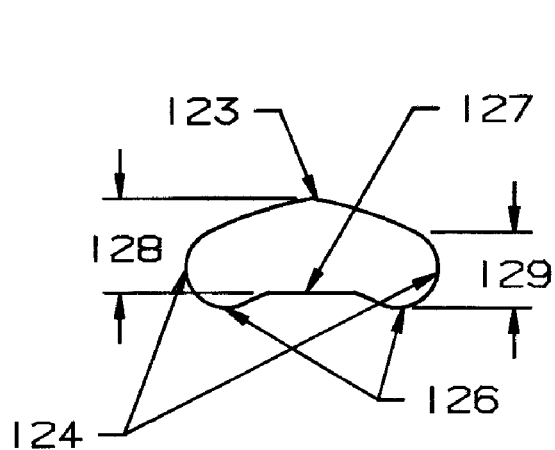
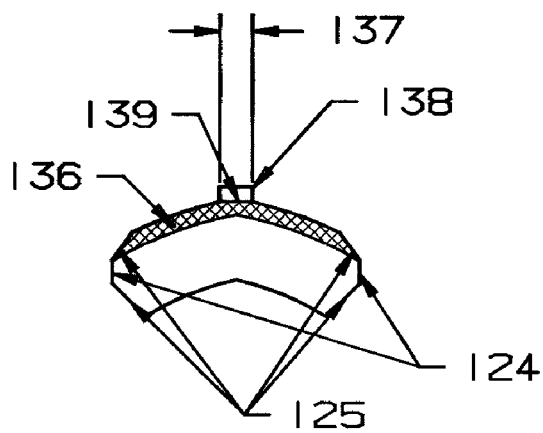
Figure 13G    Figure 13H

MOLTEN OPTICAL GLASS FINING APPARATUS

REFERENCE TO RELATED APPLICATIONS

This application claims an invention that was disclosed in Provisional Application Ser. No. 60/771,642, filed Feb. 9, 2006, entitled "MOLTEN OPTICAL GLASS FINING APPARATUS. The benefit under 35 USC §119(e) of the United States provisional application is hereby claimed, and the aforementioned application is hereby incorporated herein by reference.

In addition, this is a continuation-in-part of co-pending patent application Ser. No. 10/745,082, filed Nov. 21, 2003, entitled "MOLTEN OPTICAL GLASS FINING APPARATUS", which claims an invention which was disclosed in Provisional Application No. 60/438,875, filed Jan. 9, 2003, entitled "MOLTEN GLASS FINING APPARATUS". The benefit under 35 USC §119(e) of the U.S. provisional application is hereby claimed, and the aforementioned applications are hereby incorporated herein by reference.

BACKGROUND OF THE INVENTION

1. Field of the Invention

This invention relates generally to the manufacture of high quality glass and, more particularly, to optical quality glass used for optical lenses and glass sheet used for the production of TFT/LCD display devices that are widely used for computer displays.

2. Description of Related Art

Glass as melted from raw materials has many small bubbles of entrapped gases. These bubbles are considered defects in any glass product which requires optical properties. Bubbles of a size that can be seen by the eye or that interfere with the function of the product must be removed. The process for removing these bubbles is termed fining. Fining occurs after the glass is melted from raw materials, but before the glass is formed into a finished product. For optical quality glass this fining process is performed in a "finer" (or refiner), which is constructed of precious metal, typically platinum or a platinum alloy. The fining process is both chemical and physical. Chemicals are added to the glass such that the bubbles grow in size as they pass through the glass melting furnace and the finer. This invention is related to the physical aspect of fining, which is affected by the shape of the finer apparatus. The fining apparatus must be designed such that the removal of the bubbles from the molten glass is optimized. The finer is often very large, resulting in extremely high costs to fabricate because the glass contact surfaces are constructed of platinum or platinum alloy. In the fining process the bubbles rise to the top of the fining apparatus (finer) where they dissipate to the atmosphere. The size of the bubbles that are removed is a function of the size and design of the finer and the viscosity (fluidity) of the molten glass. In the glass industry these bubbles are called seeds if they are small (less than approximately 1 mm diameter) and blisters if they are large. Seeds are the primary concern as they are small in diameter and thus are more difficult to remove from the glass.

The glass seed entering the finer at the bottom of the inflow end of the finer must rise to the top of the finer at the outflow end where a vent to the atmosphere is located. The vertical speed of a seed in glass is inversely proportional to the glass viscosity, proportional to the square of the seed diameter, and proportional to the square of the glass density. The glass viscosity is a strong inverse function of temperature, therefore raising the glass temperature to a practical maximum increases the vertical speed of a given size seed. The detection of a seed in an optical product is a strong function of its viewable area, therefore we can use the diameter squared of a seed as the quality criteria. For a given glass the variation of the glass density in the fining process is a second order effect, thus we will consider primarily the glass viscosity and the seed cross-sectional area.

At the very high temperatures, approximately 1500° C., required to substantially reduce the glass viscosity, even the highest quality refractory materials are slowly dissolved by the glass. This introduces contamination and can also generate additional seeds in the glass.

In the prior art, a cylindrical platinum or platinum alloy (platinum herein) tube is used for all surfaces (walls) that contact the glass, such that the glass is not contaminated by the dissolution of refractory walls. The cylindrical tube is typically supported externally by refractory material (brick), which has the appropriate strength and insulating properties. The glass in the finer must be maintained at the required elevated temperature. Additionally, the glass entering the inflow end of the finer often must be heated to the desired fining temperature. This is done by either containment of the platinum and refractory finer assembly in heated (gas or electric) firebox or by electrical heating. The electrical heating of the finer is accomplished by either externally mounted electric winding (normally made of platinum) or the passing of electric current directly through the cylindrical platinum tube, thus using the electrical resistance of the tube to generate the heat.

The prior art design which has been typically used since the start of this practice in the first half of the twentieth century is a cylindrical platinum tube with and without internal baffles. The primary innovations to date have been in the design of the baffles to alter the flow path and to trap seeds for optimal seed removal. The prior art has included finer designs with and without an internal free surface.

FIG. 1A shows a simplified version of a cylindrical finer (1) as known in the prior art. FIG. 2A shows a cylindrical finer with baffles. In FIG. 1A, the molten glass (2) enters finer (1) at the inlet end (3) and flows out the outlet (4). There is a free surface, or vent (5), at the outlet end (4), which is connected to the atmosphere, to allow the seeds which accumulate at the top of the finer (1) to escape. FIG. 1B shows the typical path of seeds (7) in a finer with a cylindrical cross-section (1), which enter the glass inlet (3) entrapped in the molten glass (2). Shown are seeds which enter at the bottom of the finer inlet (3) and which must rise to the top of the finer at the outlet (4) so they may dissipate from the vent (5) to the atmosphere. With this cylindrically shaped finer (1) and with this size seed the length of the finer is such that the seeds just reach the top of the finer (1) where they are exposed to the vent (5) and can dissipate to the atmosphere.

The finer shown in FIGS. 1A and 1B has a diameter of 0.382 meters and a length of 2.5 meters. The glass flow rate is 7.41 metric tons per day. The viscosity is 100 poise. The seed diameter is 0.0007 meters. These parameters can be changed by normalizing using the equation:

$$Q_1 * d_1^2 / \eta_1 = Q_0 * d_0^2 / \eta_0$$

where:
Q equals glass flow,
η equals glass viscosity, and
d equals seed diameter In the baffled finer of FIG. 2A, the molten glass (2) enters the baffled finer (21) at the glass inlet end (23) and flows out the outlet (24). There is a vent (25) at the outlet end (24), which is connected to the atmosphere, to allow the seeds which accumulate at the top of the baffled finer (21) to escape. Some of the baffles (26) have holes (22) which are sized to distribute the flow of the molten glass (2) such that the average residence time for the glass as it flows through the baffled finer (21) is more uniform. Other baffles (28) are designed to move the flow path vertically. There is often a vent (29) in front of a baffle as baffles also trap the surface seeds into a foam-like accumulation which breaks down and dissipates into the atmosphere. FIG. 2B shows the movement of seeds (27) through the baffled finer (21). The baffles (26) and (28) make the paths of the seeds (27) in the baffled finer (21) quite tortuous. This allows the smaller seeds greater opportunity to coalesce together and form a larger seed, which in turn will rise faster.

SUMMARY OF THE INVENTION

The present invention significantly modifies the currently known fining apparatus (finer). The basic shape is changed from a cylindrical shape to an elliptical shape, a somewhat rectangular shape, variations on a gabled roof shape, or variations on a gothic arch shape, such that the flow is more uniform and the seeds have less distance to rise to the surface. Baffles of a novel design are optionally included in an embodiment of the present invention to further increase fining performance. Prior art baffle designs are optionally included in an embodiment of the present invention to trap seeds and serve as structural elements. The present invention improves the fining capability of the apparatus without increasing the cost of construction materials. In fact, the cost would be reduced for the same fining performance by shortening the length of the finer.

BRIEF DESCRIPTION OF THE DRAWINGS

FIG. 3A shows a cylindrical cross-section of a finer as known in the prior art.

FIG. 3B shows an elliptical cross-section of a finer in an embodiment of the present invention.

FIG. 3C shows a square cross-section of a finer.

FIG. 3D shows a rectangular cross-section of a finer in an embodiment of the present invention.

FIG. 3E shows a rectangular with chamfered sides cross-section of a finer in an embodiment of the present invention.

FIG. 3F shows a rectangular with curved sides cross-section of a finer in an embodiment of the present invention.

FIG. 3G shows a rectangular with curved sides and an arced top and bottom cross-section of a finer in an embodiment of the present invention.

FIG. 3H shows a cross-sectional shape similar to FIG. 4G, except the top and bottom surfaces are not parallel.

FIG. 5A shows a finer with a rectangular cross-section and an aspect ratio of 3.00 in an embodiment of the present invention.

FIG. 10A shows a side view of the seeds rising in the rectangular finer of FIG. 4B, where the glass contacts all the internal surfaces.

FIG. 10B shows a side view of the seeds rising in the rectangular finer of FIG. 4B, where the glass does not contact the top surface.

FIG. 11A shows a finer with an enlarged rectangular cross-section and a free surface in an embodiment of the present invention.

FIG. 12E shows a six sided gable roof finer cross-section with radii at the ends in an embodiment of the present invention.

FIG. 12F shows a six sided gable roof finer cross-section with radii and chamfers at the ends in an embodiment of the present invention.

FIG. 12G shows a seven sided gable roof finer cross-section with radii at the ends in an embodiment of the present invention.

FIG. 12H shows a six sided gable roof finer cross-section with fining ribs and chamfered ends in an embodiment of the present invention.

FIG. 13A shows a five sided Gothic arch roof finer cross-section in an embodiment of the present invention.

FIG. 13B shows a six sided Gothic arch roof finer cross-section in an embodiment of the present invention.

FIG. 13C shows a seven sided Gothic arch roof finer cross-section with fining ribs in an embodiment of the present invention.

FIG. 13D shows a six sided Gothic arch roof finer cross-section with fining ribs and chamfered ends in an embodiment of the present invention.

FIG. 13E shows a five sided Gothic arch roof finer cross-section with a curved bottom and radii at the ends in an embodiment of the present invention.

FIG. 13F shows a six sided Gothic arch roof finer cross-section with radii and chamfers at the ends in an embodiment of the present invention.

FIG. 13G shows a seven sided Gothic arch roof finer cross-section with radii at the ends in an embodiment of the present invention.

FIG. 13H shows a six sided Gothic arch roof finer cross-section with fining ribs and chamfered ends in an embodiment of the present invention.

DETAILED DESCRIPTION OF THE INVENTION

Figure 1A:
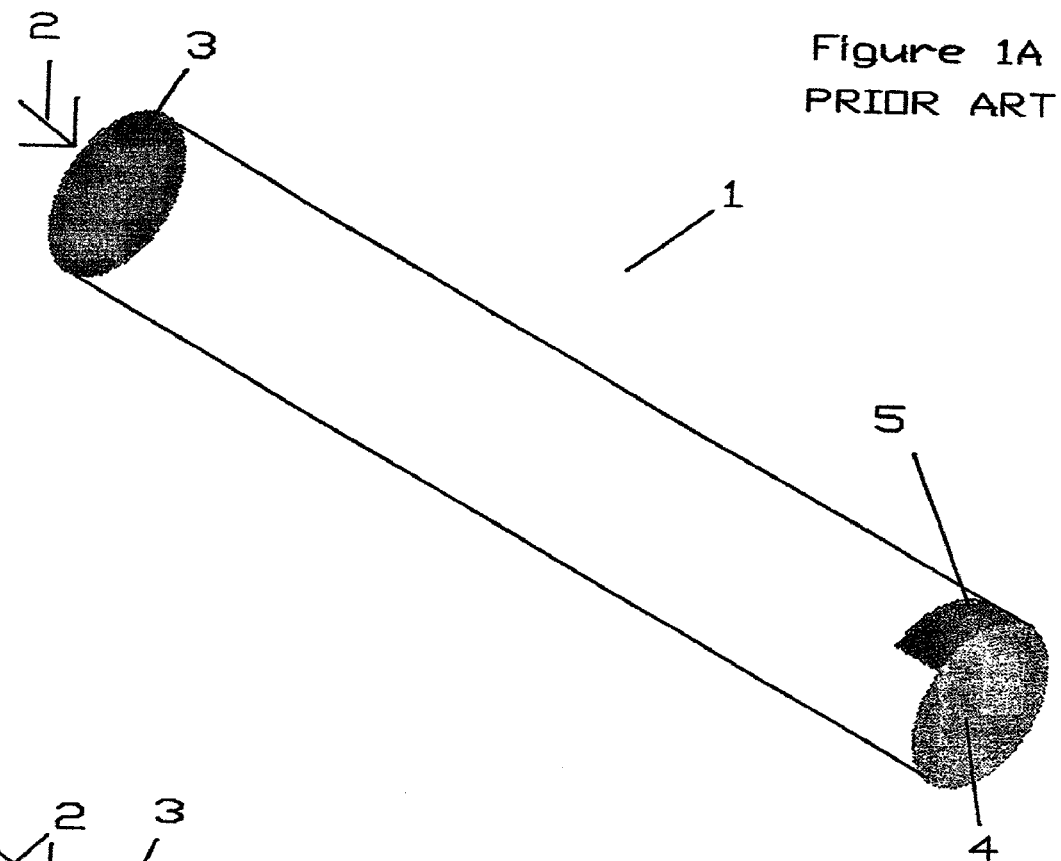
FIG. 1A shows a cylindrical finer as known in the prior art.

In all embodiments of this invention, all glass contact surfaces (walls) are preferably either fabricated from platinum or are clad with platinum in some manner.

Operating at the highest practical temperature is desirable. This temperature is limited by the high temperature physical properties of the platinum and/or platinum alloy used in the fining apparatus. Structural elements made of platinum, including webs and struts both external and internal, are preferably added to the surfaces of the platinum cylinder to prevent excessive deformation for the expected duration of the production campaign.

Platinum is extremely expensive compared to the refractory material and steel required to construct the fining apparatus. The platinum required for the construction of an optical finer can cost in the millions of dollars. Controlling the quantity of platinum used to construct the fining apparatus substantially determines the cost of the fining apparatus. In this patent application the criteria for measuring the potential cost is the total surface area of the platinum in contact with the glass. This is the perimeter of the finer times the length of the finer in the configuration where the finer has little or no internal free surface. In the finer configuration with a substantial internal free surface, the area of the top of the finer which is not platinum or platinum clad is subtracted from this calculation.

A performance criteria is required to evaluate the embodiments of this invention relative to the prior art. It is assumed that the glass entering the finer contains an even distribution of seeds that must be removed by the finer. The seeds entering at the bottom of the finer must rise to the top at the exit location where they are vented to the atmosphere, therefore the seeds in the examples all enter the finer at the bottom of the finer. All of the examples have the same glass flow rate, contain the same maximum seed size and these seeds enter the finer at the bottom surface. Some examples have smaller seeds to demonstrate improved fining capability. All of the examples contained herein and shown in the Figures have the same area in contact with flowing glass, except as specifically noted. Maintaining the surface area constant closely approximates the quantity of platinum required in the subject embodiment. An exception to this is the incorporation of internal baffles in the prior art and in some of the embodiments. The fining ribs and the apex vent defined herein also require a small additional quantity of platinum.

The present invention overcomes the shortcomings of the prior art in two ways. First, by increasing the ratio of cross-section area to height of the finer, the seeds have less distance to rise relative to the time for the glass to pass through the finer. Second, by making the shape thin and wide, the velocity distribution of the flow through the finer is more uniform. The "walls" of the finer define the cross-sectional shape. As defined in the application, the walls may either be a single continuous portion (i.e. a cylinder or an ellipse), or discrete portions (i.e. a square or a rectangle).

A key parameter in this invention is the aspect ratio. The aspect ratio used herein is the width of the finer divided by the height of the finer. Both dimensions are measured in the plane perpendicular to the direction of glass flow.

The ratio of the cross-sectional area for flow to the height of the apparatus is an important parameter in all the embodiments of the present invention. The designs of the present invention maximize this parameter. Simultaneously, if the perimeter of the apparatus is held constant, the cost of the platinum and other construction materials remain substantially the same. The velocity of flow of the glass is proportional to the volume flow of the glass divided by the cross-sectional area.

The ratio of finer cross-sectional area to finer height is indicative of the relative fining performance of a finer design. The larger the area for flow, the slower the molten glass moves through the finer, allowing more time for the seeds to rise. The lower the height of the finer, the less distance the seeds must rise. The ratio of the two parameters creates an additional parameter termed "performance ratio" herein. The higher the performance ratio, the faster the finer removes seeds. The performance ratio is a figure of merit, not an exact determinant of performance, especially when the shapes become more complex.

Seeds rise in the liquid glass at a speed proportional to the square of the diameter of the seed. The larger the seed, the faster it rises. The flow dynamics in the embodiments of the present invention are designed to make the velocity profiles as uniform as possible, in all vertical planes, within the constraints of Newtonian Fluid Flow.

FIGS. 3A to 3H show various finer cross-sections. These shapes all have the same perimeter, therefore the cost of construction is substantially equal. Table 1 shows the height, width, cross-sectional area, width to height ratio (aspect ratio) and performance ratio for each cross-sectional shape.

TABLE 1

| FIG. | Height | Width | Aspect Ratio | Area | Performance Ratio |
|---|---|---|---|---|---|
| 3A | 0.3183 | 0.3183 | 1.00 | 0.0796 | 1.00 |
| 3B | 0.1497 | 0.4489 | 3.00 | 0.0528 | 1.41 |
| 3C | 0.2500 | 0.2500 | 1.00 | 0.0625 | 1.00 |
| 3D | 0.1250 | 0.3750 | 3.00 | 0.0469 | 1.50 |
| 3E | 0.1367 | 0.4102 | 3.00 | 0.0529 | 1.55 |
| 3F | 0.1400 | 0.4200 | 3.00 | 0.0546 | 1.56 |
| 3G | 0.1396 | 0.4188 | 3.00 | 0.0545 | 1.56 |
| 3H | 0.1383 | 0.4148 | 3.00 | 0.0547 | 1.58 |

The perimeter of all of the shapes is the same, normalized to 1.00 unit of distance, thus the comparisons in Table 1 are between shapes with the same cost of raw materials. In order to simplify the comparisons between the performance ratios (cross-sectional area divided by height) of the various shapes, the performance ratio of the prior art cylindrical finer (FIG. 3A) has been adjusted to 1.00. This was done by multiplying the area divided by the height by a factor of four.

FIG. 3A shows the cylindrical cross-section as known in the prior art. The cylindrical finer has an aspect ratio of 1.00 and a performance ratio of 1.00. In contrast, the cross-sectional shape of the finer of the present invention preferably has a width to height ratio (aspect ratio) substantially greater than 1.00. The aspect ratio of the finer is preferably 1.50 or greater. In a preferred embodiment, the aspect ratio of the finer is approximately 3.00. In another preferred embodiment, the aspect ratio of the finer is approximately 6.00.

FIG. 3B shows an elliptical cross-section of a finer of the present invention, with an aspect ratio of 3.00. Its performance ratio is 1.41, which means that it removes seeds more quickly than the cylindrical cross-section of FIG. 3A.

Figure 1B:
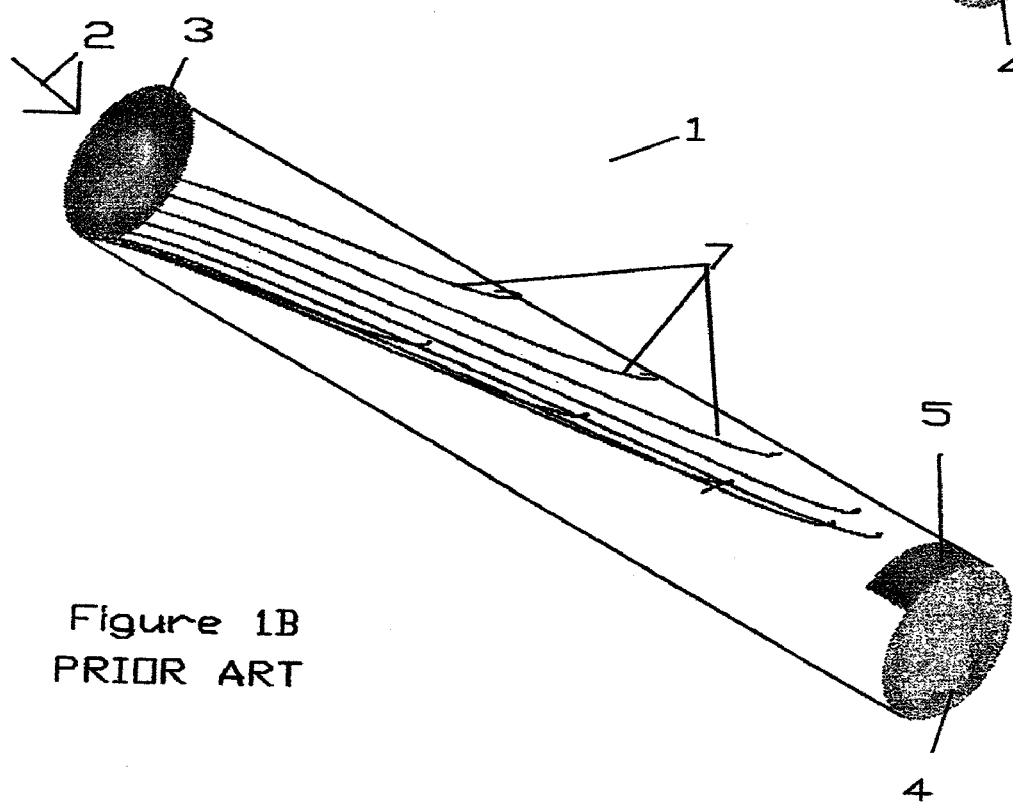
FIG. 1B shows the rising of seeds in a finer of FIG. 1A.

FIG. 3C shows a square cross-section of a finer, the performance of which is compared to that of the cylindrical cross-section finer in FIGS. 1A and 1B. Since its performance ratio is 1.00, it removes seeds with approximately the same efficiency as the finer with the cylindrical cross-section in FIG. 3A.

FIG. 3D shows a rectangular cross-section of a finer of the present invention. This finer has an aspect ratio of 3.00 and a performance ratio of 1.50. This finer removes seeds substantially more quickly than the finer with the cylindrical cross-section, shown in FIG. 3A, or the finer with the square cross-section, shown in FIG. 3C.

FIGS. 3E, 3F, 3G and 3H are various embodiments of a finer with a substantially rectangular cross-section. All of these embodiments have an aspect ratio of 3.00. The finer in FIG. 3E has a rectangular cross-section with sides, or corners, which are preferably chamfered or curved. FIG. 3F shows a rectangular cross-section with rounded or curved sides. FIG. 3G shows a rectangular cross-section with rounded or curved sides and an arced top and bottom. This design increases structural rigidity. FIG. 3H is similar to the shape of FIG. 3G, except that its top (38) and bottom (39) surfaces are not parallel. The flow velocity at the center of the parallel top (38) and bottom (39) surfaces in FIG. 3G is slightly faster than at the sides (31). The cross-section in FIG. 3H has a bottom surface (39), which is arced more than the top surface (38), making the vertical distance (30) at the center slightly less. This altered cross-section both slows the relative velocity of the glass at the center and decreases the distance that seeds must rise. This equalizes the fining performance over a greater percentage of the width of the finer.

Figure 2A:
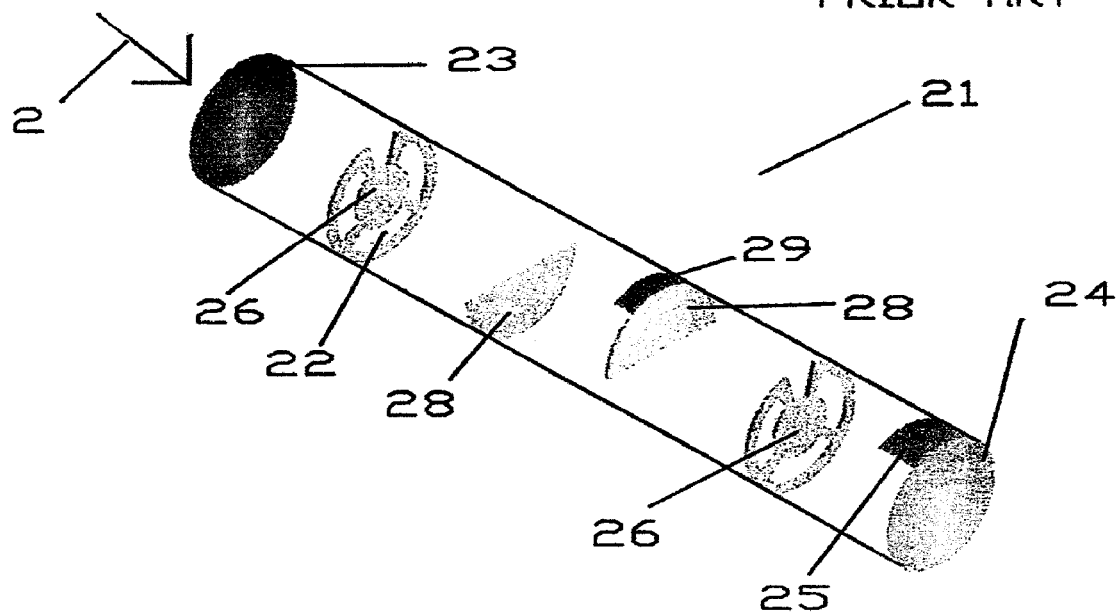
FIG. 2A shows a cylindrical finer with baffles as known in the prior art.
Figure 2B:
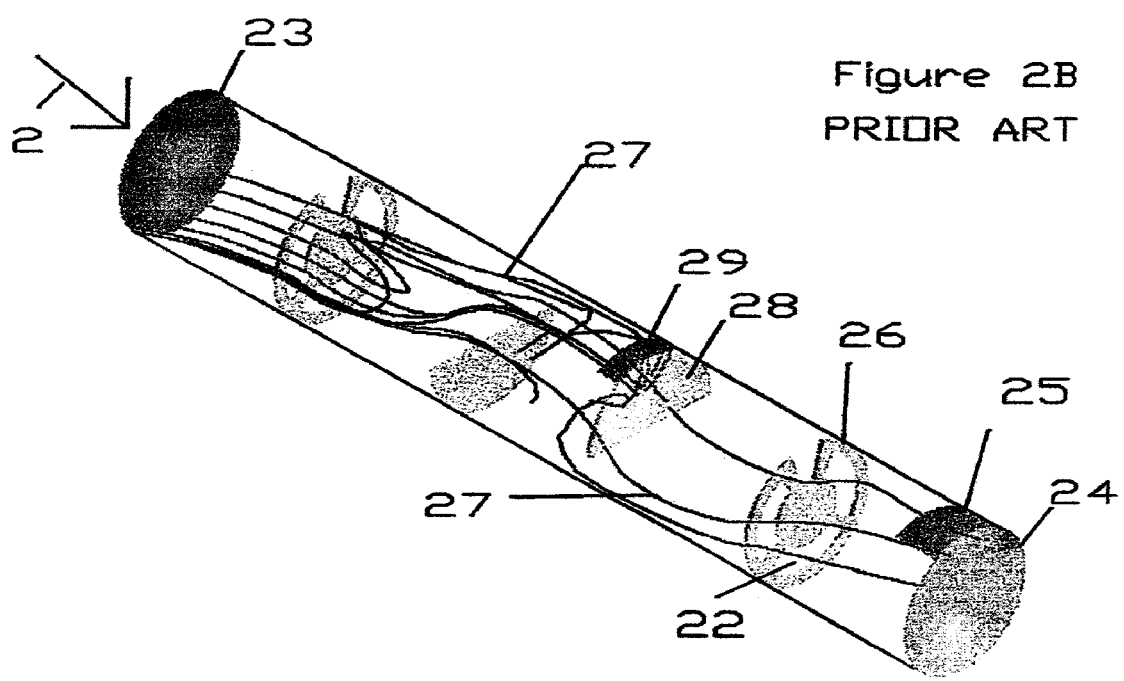
FIG. 2B shows the rising of seeds in the finer of FIG. 2A.

The seed trajectories shown in FIGS. 1B and 2B and subsequent Figures in this application were calculated using a technology termed "computational fluid dynamics" which uses computers to predict the motion of gases and liquids. The particular product used for the calculations herein was CFD2000®, which is one of several products that are commercially available. In FIGS. 1B, 2B, 4B, 5B, 6B, 7B, 8B, 10A, 10B, 11B, 14A,14B,14C,15A,15B,16A, 16B,17A, 17B, 18A, and 18B, where trajectories are shown, the perimeter and length of each finer discussed are all equal in order to provide consistency in the interpretation of the finer performance.

Figure 4A:
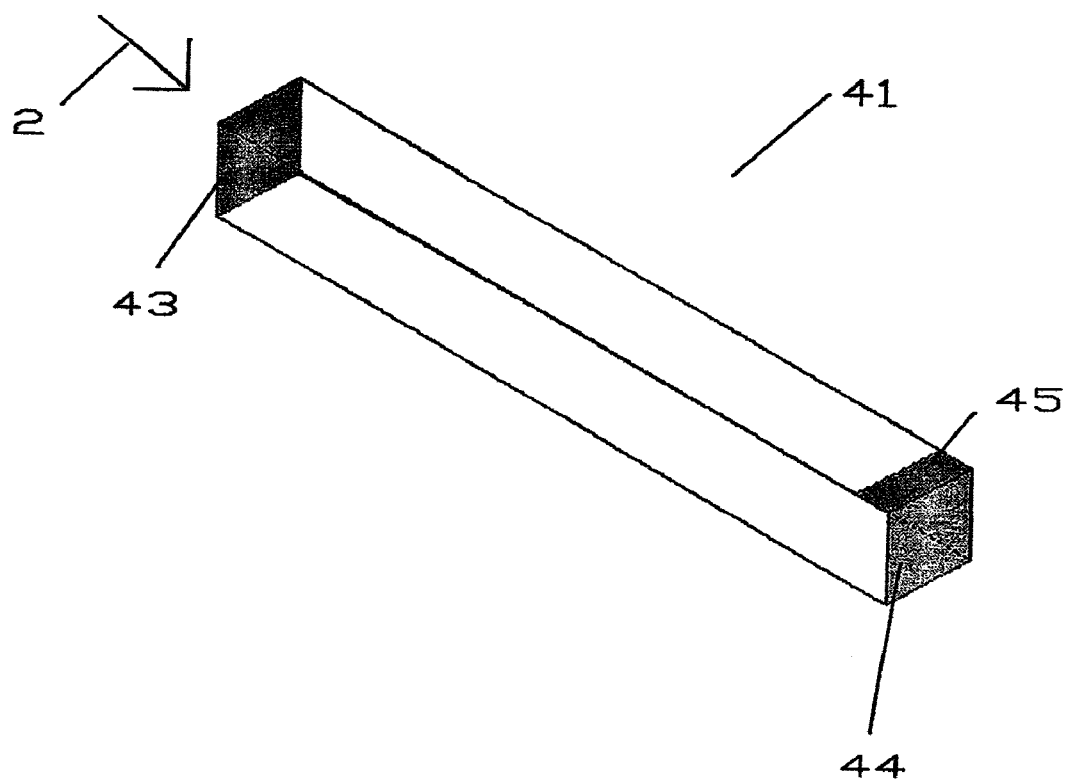
FIG. 4A shows a square cross section finer.

FIG. 4A shows a finer (41) with a square cross-section, which has the same perimeter as the finer with the cylindrical cross-section (1) in FIG. 1A and is the same length as the finer with the cylindrical cross-section (1) in FIG. 1A.

Figure 4B:
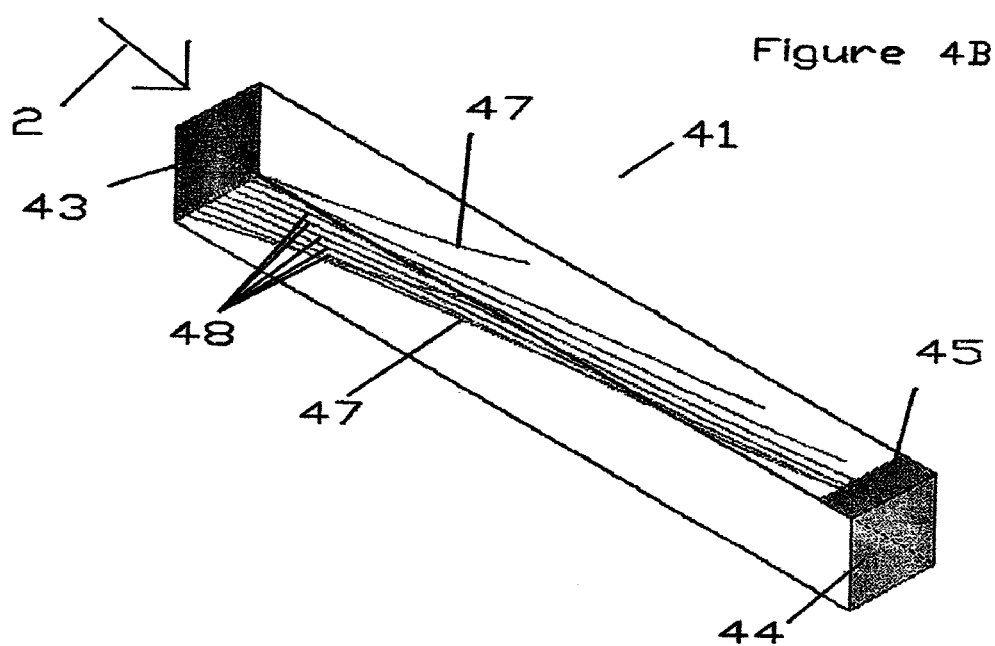
FIG. 4B shows the rising of seeds in the finer of FIG. 4A.

FIG. 4B shows the paths of the seeds (47) rising in the finer shown in FIG. 4A. Shown are the paths of seeds entrapped in the molten glass (2), which enters at the bottom of the inlet (43). The seeds rise to the vent (45) at the outlet (44) in approximately the same distance as in the finer with the cylindrical cross-section (1). This verifies that the performance ratio analogy is valid for cross-sections as widely different as circular and square cross-sections.

FIG. 5A shows a finer (51) with a rectangular cross-section that has an aspect ratio of 3.00 and which has the same perimeter as and is the same length as the finer with the cylindrical cross-section (1) in FIG. 1A and the square cross-section (41) in FIG. 4A.

Figure 5B:
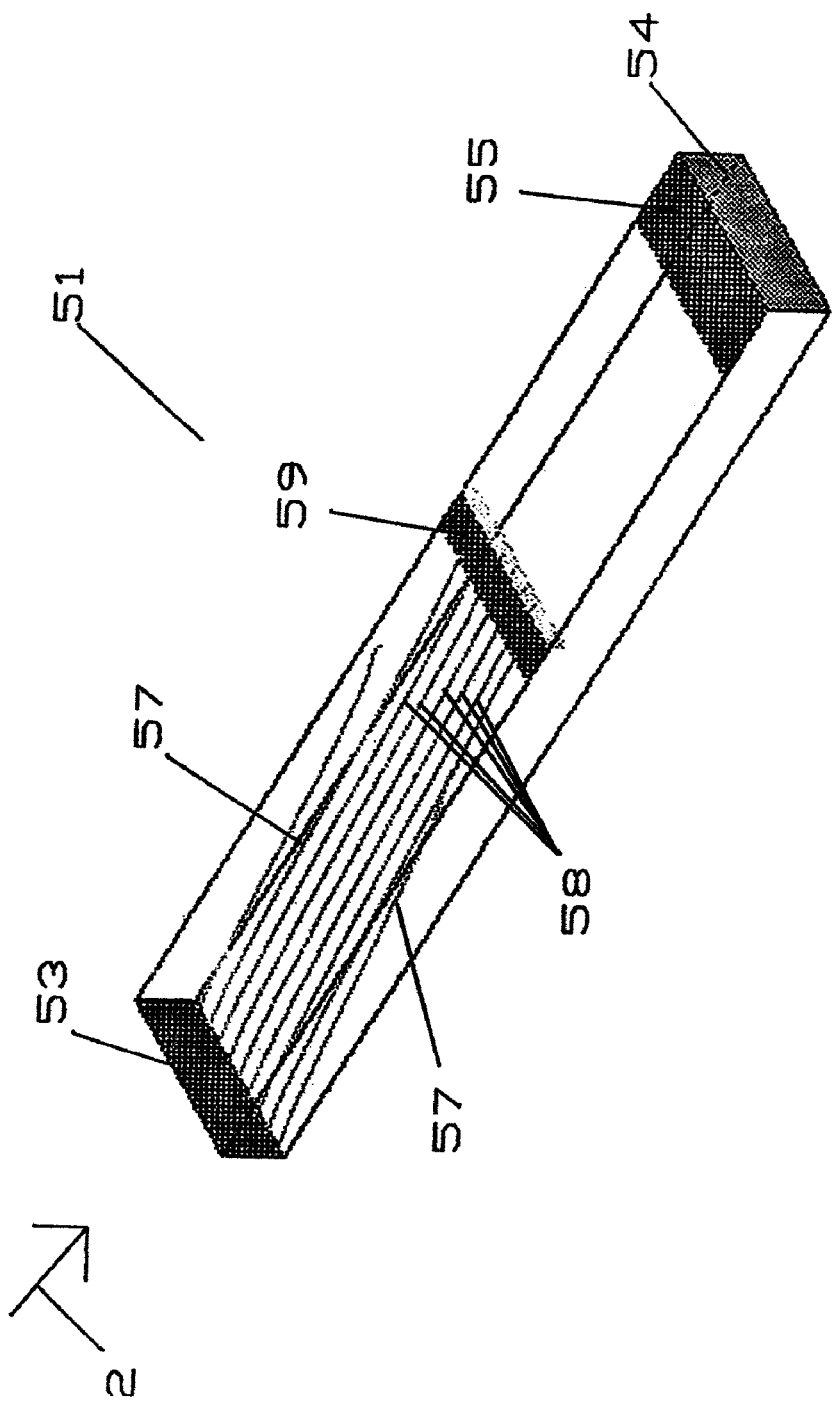
FIG. 5B shows the rising of seeds in the finer of FIG. 5A.

FIG. 5B shows the paths of the seeds (57) rising in the finer shown in FIG. 5A. Shown are the paths of seeds entrapped in the molten glass (2) which enters at the bottom of the inlet (53). In order to rise to the top of the finer (51), the seeds (57) travel a much shorter distance than in either the finer with the cylindrical cross-section (1), shown in FIG. 1B, or the finer with the square cross-section (41), shown in FIG. 4B. The seeds then proceed along the top of the finer until they reach a first vent (59) along the top of the finer or a second vent (55) at the outlet (54) where they dissipate to the atmosphere. The first vent (59) allows seeds that have risen to the top of the finer (51) prior to reaching the vent (59) to dissipate to the atmosphere. Other seeds, which may not yet have risen to the top of the finer at the vent (59), continue to travel through the finer, and dissipate to the atmosphere through the vent (55).

The first vent (59) is optional, and the invention also contemplates a single vent (55) at the outlet end of the finer without deviating from the spirit of the invention. Since the rate the seeds rise is proportional to the square of the diameter, the larger seeds will dissipate faster in a shorter finer permitted by the present invention. With two vents, the larger seeds are released to atmosphere earlier through the first vent (59). Then, the smaller seeds dissipate to atmosphere through the vent (55). This allows for smaller seeds to be removed from the glass than in the prior art finers. In this embodiment, a shorter finer can be constructed with the same fining performance as the prior art, thus saving substantial construction cost.

Another novel property of the wide (high aspect ratio) finer is that the flow velocity is more uniform over the width of the finer. This is illustrated by comparison of the paths of the seeds (47) in the finer with the square cross-section (41), shown in FIG. 4B, with the paths of the seeds (57) in the finer with the rectangular cross-section (51), shown in FIG. 5B. There are nine paths shown in each finer configuration. The center five paths (58) in the finer with the rectangular cross-section (51) are substantially the same length, whereas, except for symmetry, the center five path lengths (48) in the finer with the square cross-section (41) are different. The same comparison can be made with the cylindrical cross-section finer (1) of FIG. 1B. Except for symmetry, the path lengths of the seeds (7) in the cylindrical finer (1) are all different. This increases the fining efficiency even more than the performance ratio indicates.

Figure 6A:
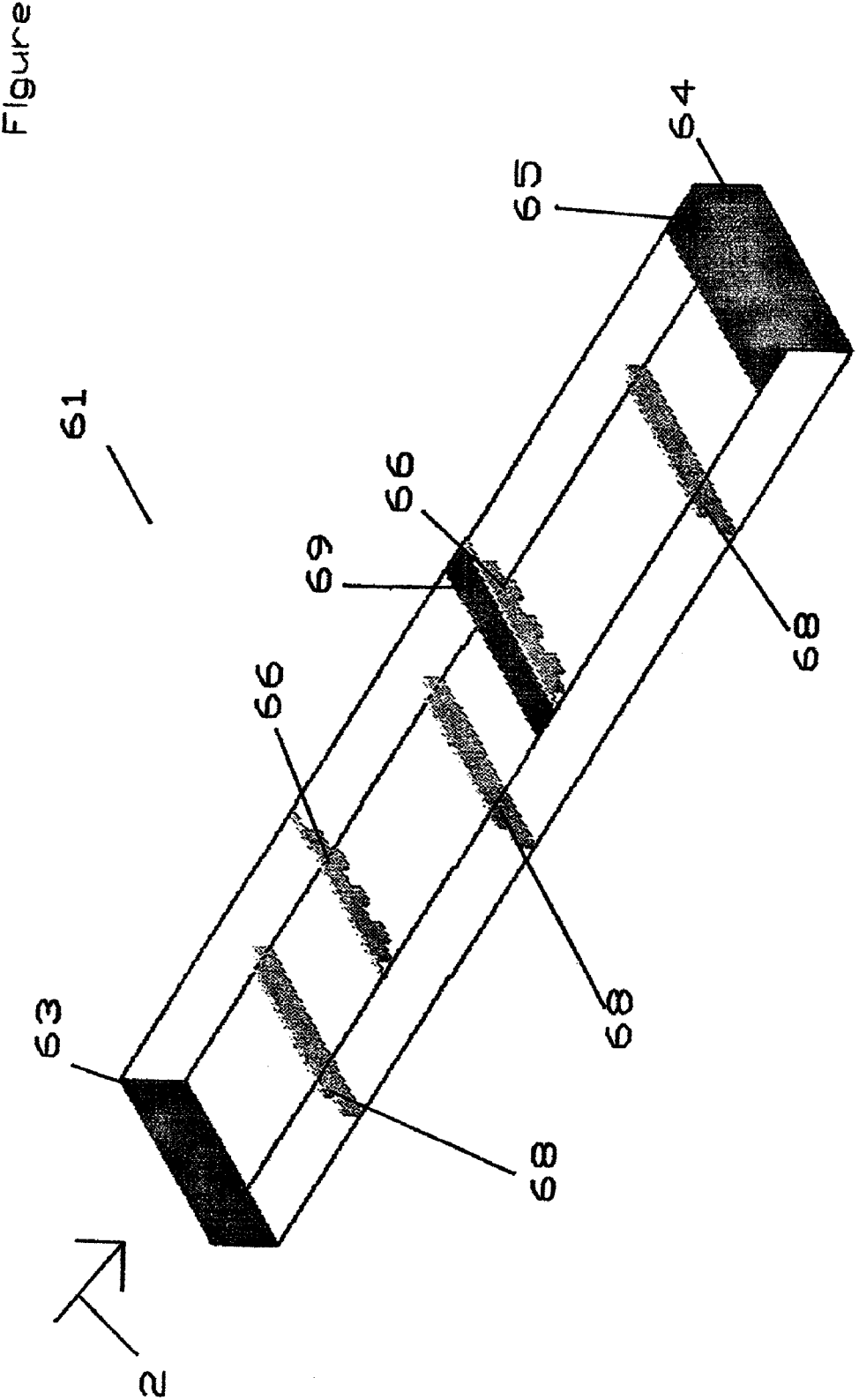
FIG. 6A shows a rectangular cross-section finer with prior art baffles in an embodiment of the present invention.
Figure 6B:
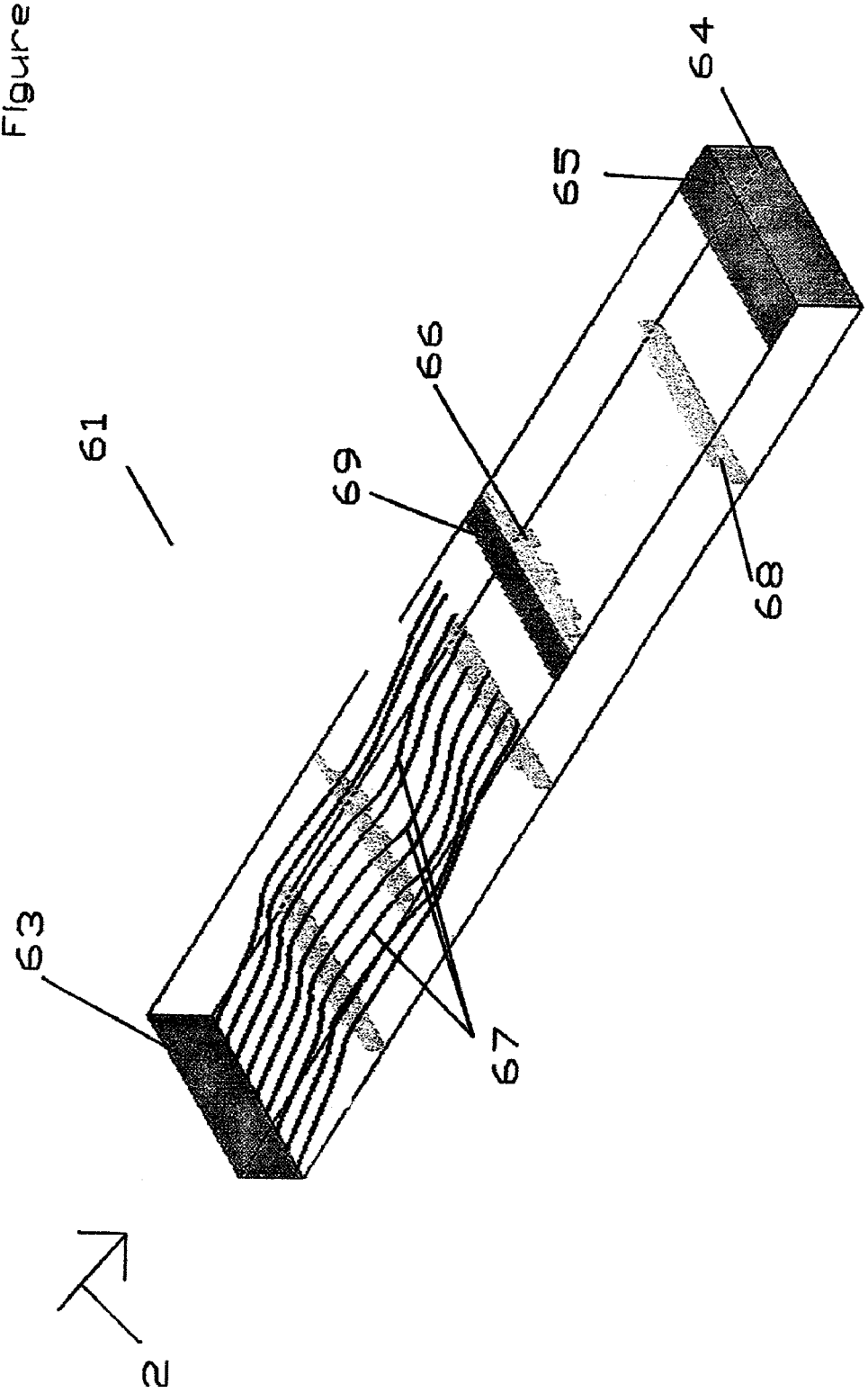
FIG. 6B shows the rising of seeds in the finer of FIG. 6A.

FIG. 6A shows a finer (61) with a rectangular cross-section, similar to the finer (51) shown in FIG. 5A, incorporating prior art type baffles. As discussed above, the molten glass (2) enters the finer (61) at the inlet end (63). A vent (65) is located at the outlet end (64) of the finer (61). Baffles (66) and (68) of different shapes are added to further redistribute the flow and to trap seeds that have risen to the free surface at a vent (69) in front of one of the baffles (66). In addition, the baffles (66) and (68) act as structural elements in the finer (61). FIG. 6B shows the trajectories of the seeds (67) in the finer (61) of FIG. 6A. Note that the trajectories of the seeds (67) are of substantially the same length.

Figure 7A:
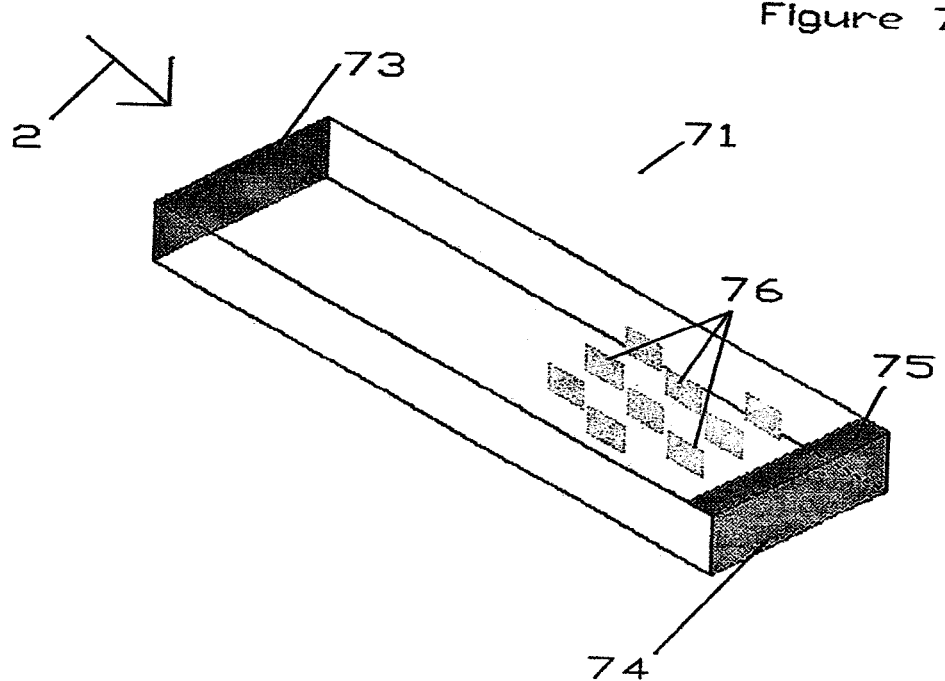
FIG. 7A shows a shortened rectangular cross-section finer with novel fin type baffles in an embodiment of the present invention.

FIG. 7A shows a finer with a rectangular cross-section (71), which has been made shorter to save the cost of construction materials and to achieve the same performance as the cylindrical finer in FIG. 1A. This finer incorporates a novel fin type baffle (76) design, whereby the baffles (76) are aligned with the direction of glass flow. Prior art baffles are mounted perpendicular to the direction of glass flow and have significant volumes of dead flow on the front and back sides. The novel baffle (76) design slows the glass flow via viscous drag which is the same phenomenon as the viscous drag caused by the walls of the finer. This baffle design could be incorporated into any of the cross-sectional shapes for the finer of the present invention.

The baffles (76) shown are in the form of fins and are mounted at the top of the finer near the outlet (74) of the finer. The fins are preferably aligned at an acute angle to the direction of glass flow. The glass at the top of the outlet (74) of the finer has a multitude of seeds not yet removed. The baffles (76) slow the flow at this location due to viscous drag such that the seeds have more time to rise and dissipate, whereas the glass flowing beneath the baffles (76) at the bottom of the finer at this location near the outlet (74) is sufficiently fined and is allowed to flow rapidly out the exit. The vent (75) allows the seeds (77) to escape to the atmosphere.

Figure 7B:
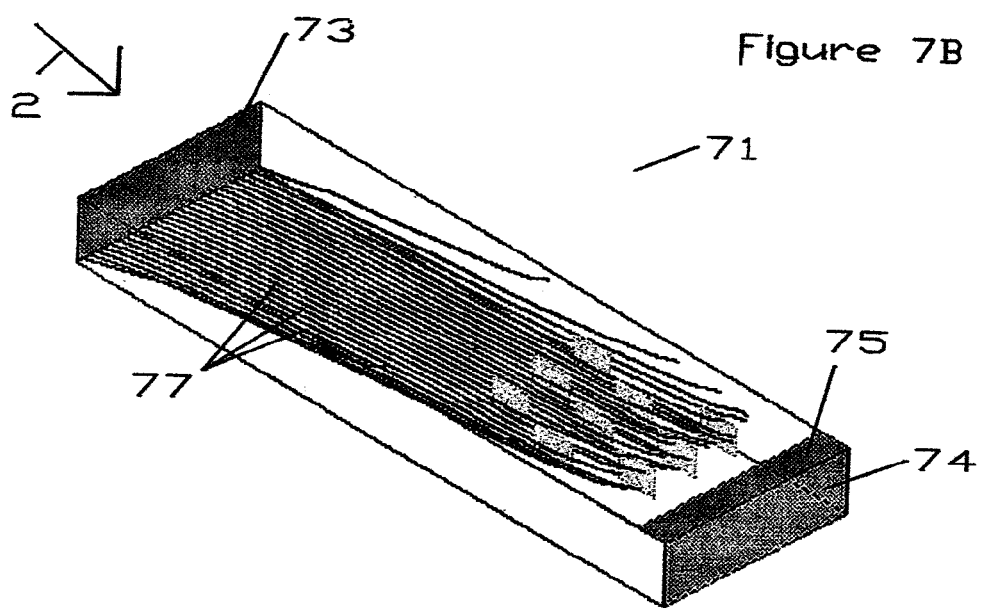
FIG. 7B shows the rising of seeds in the finer of FIG. 7A.

FIG. 7B shows the trajectories of seeds (77) in the baffled finer (71) of FIG. 7A. The trajectories of twenty seven seeds are shown, as the paths between the baffles are quite complex.

The bottom of the finer near the inlet (73) is another location for baffles (76) of this design. Baffles (76) of this design may be used at other locations in the finer where redistribution of flow is desirable.

The fin baffles shown have a plane surface and are directly aligned to the glass stream. In alternative embodiments, the fins have a curved surface and/or are set at an angle to the glass steam. These fins would resemble the stator section of a gas turbine.

Figure 8A:
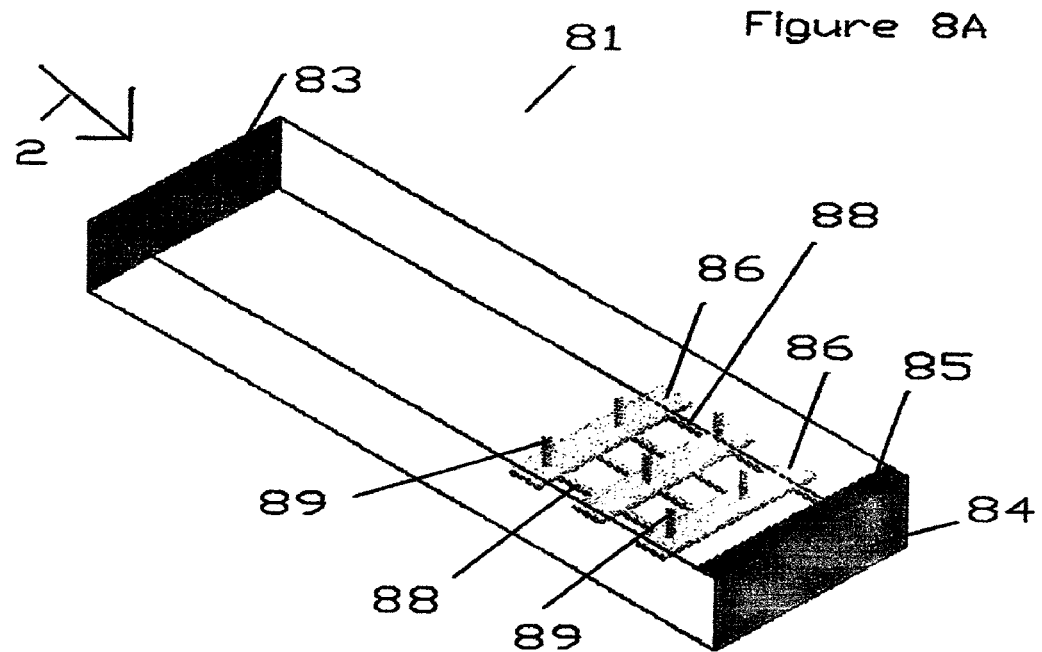
FIG. 8A shows a shortened rectangular cross-section finer with novel plate and post type baffles in an embodiment of the present invention.

FIG. 8A shows a finer with a rectangular cross-section (81), which incorporates another baffle (86) design. This design includes plates (86), similar to the fins, but which are mounted in the central portion of the glass stream by posts (89) and connected by struts (88). Unlike the fins (76), which are connected to at least one wall, the plates (86) are mounted away from the walls. The glass enters the finer (81) at the inlet end (83). As shown, the plates (86) are mounted horizontally which is substantially parallel to the top and bottom surfaces of the finer such that streamlines of flow are altered primarily by the viscous drag of the surface of the plates. A surface of each plate (86) is preferably substantially parallel to a set of streamlines of flow through the finer.

Figure 8B:
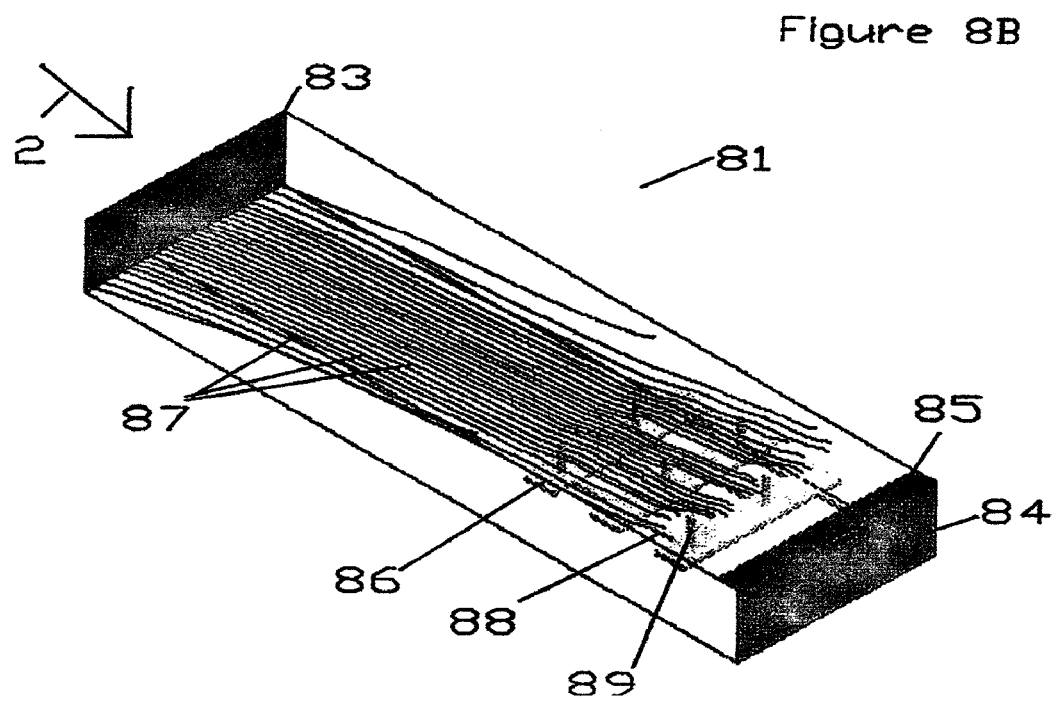
FIG. 8B shows the rising of seeds in the finer of FIG. 8A.

FIG. 8B shows the trajectories of seeds (87) in the baffled finer (81) of FIG. 8A. The trajectories of twenty seven seeds are shown. The vent (85) allows the seeds (87) to escape to the atmosphere at the outlet end (84).

Figure 8C:
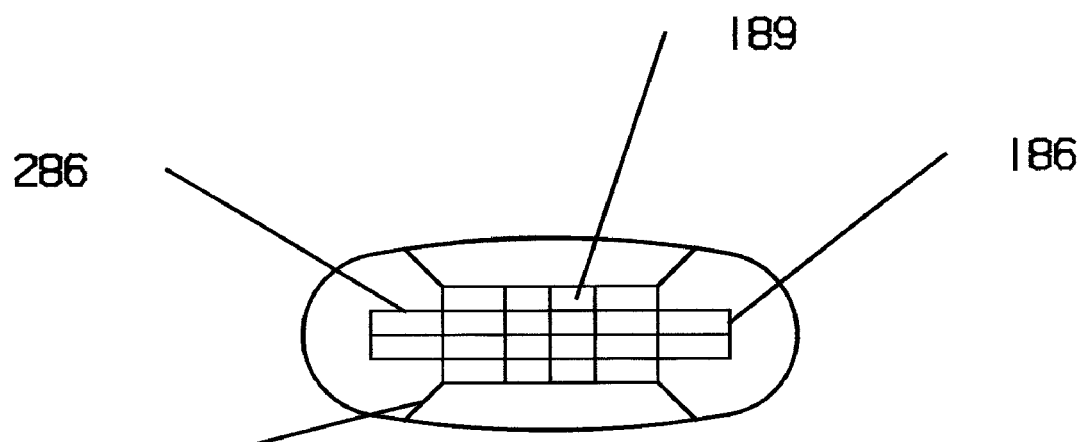
FIG. 8C shows a plurality of vertical plates connecting a plurality of horizontal plates to produce a structure through which the passages for flow are rectangular in cross-section in an alternative embodiment of the present invention.
Figure 8D:
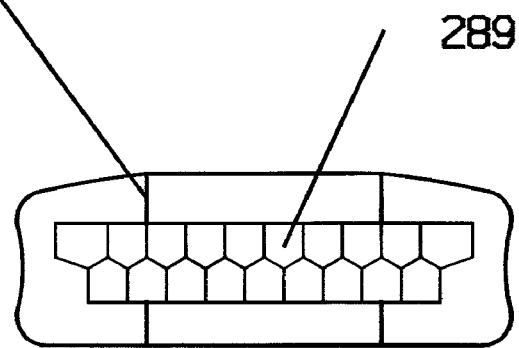
FIG. 8D shows a plurality of angled plates, such that the passages through the structure are pentagonal in cross-section in an alternative embodiment of the present invention.
Figure 8E:
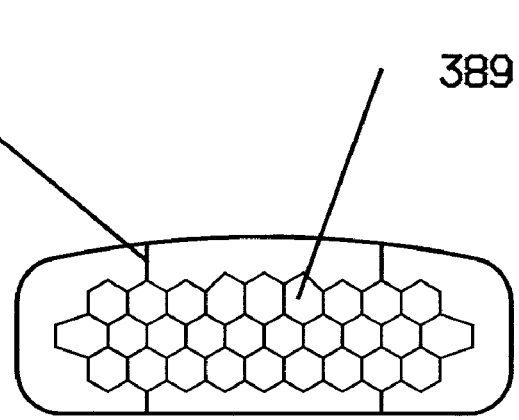
FIG. 8E shows a plurality of angled plates, such that the passages through the structure are hexagonal in cross-section in an alternative embodiment of the present invention.

The plates may also be mounted vertically. A plurality of vertical plates (186) may be used to connect a plurality of horizontal plates (286) to produce an egg-crate type structure through which the passages (189) for flow are rectangular in cross-section, as shown in FIG. 8C. The plates need not all be in either horizontal or vertical planes, but may alternately be angled relative to each other such that the passages through the structure are either pentagonal (289) or hexagonal (389) in cross-section, as shown in FIGS. 8D and 8E respectively. A hexagonal cross-section efficiently uses platinum.

In alternative embodiments, the plates have a curved surface and/or are set at an angle to the glass steam, such that the velocity of the glass flow is also altered by said shape of and angle of the plates.

Figure 9:
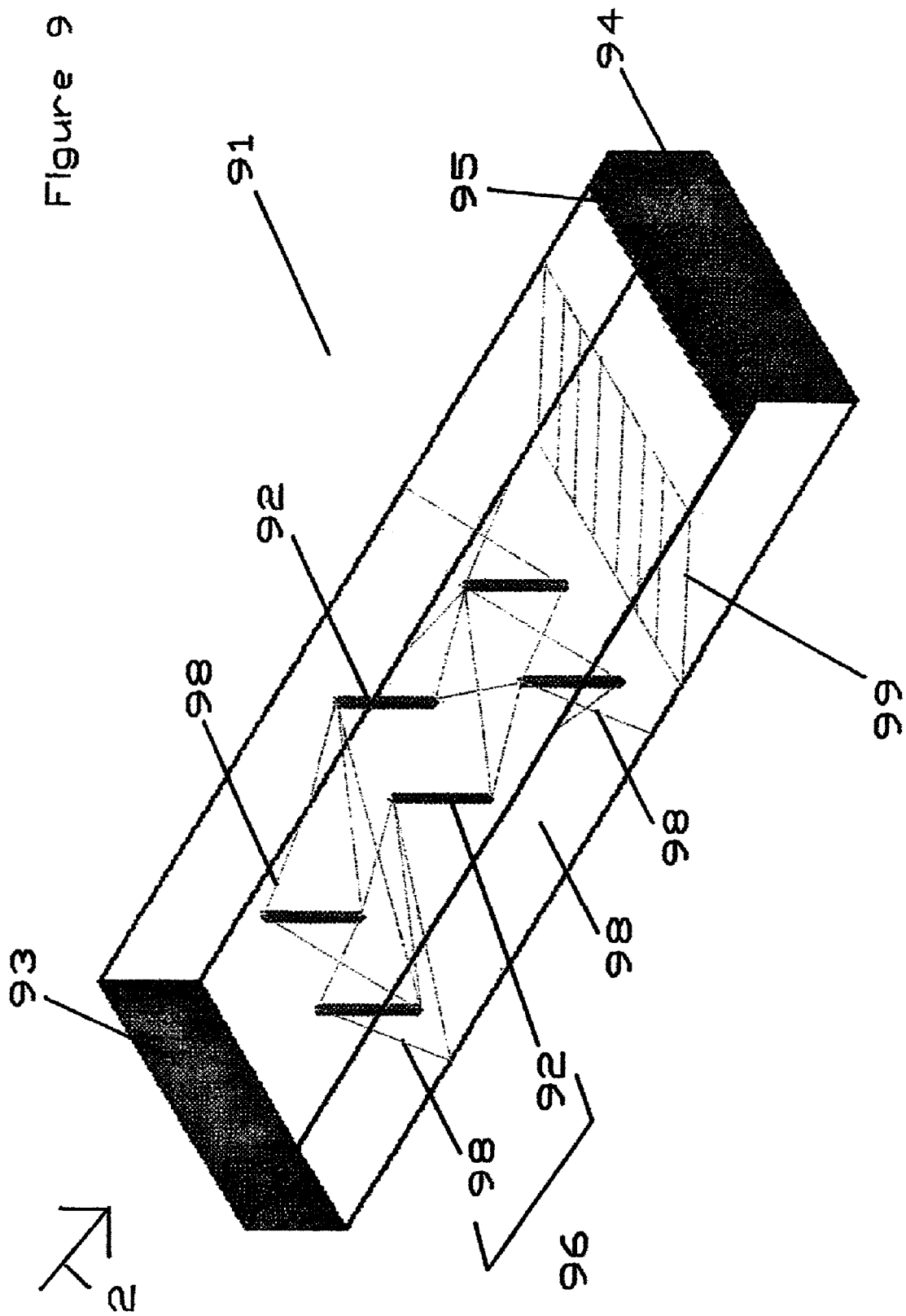
FIG. 9 shows a rectangular cross-section finer with novel rod type baffles in an embodiment of the present invention.

FIG. 9 shows another embodiment of the present invention. The glass enters the finer (91) at the inlet end (93). The vent (95) allows the seeds to escape to the atmosphere at the outlet end (94). The finer (91) in this embodiment includes a first matrix (96) of many thin rods (92) and (98) placed in the glass stream such that any seed passing through the finer passes in close proximity to a rod. The matrix (96) includes both vertical rods (92) and rods (98) angled upward in the direction of glass flow such that viscous forces assist the rise of the seeds. The matrix (96) is much like a random maze of rods.

A second matrix of rods (99) includes multiple rods (99) preferably slanted in an upward direction such that viscous forces of the glass passing the rods drag the seeds toward a top of the finer. A seed attaches itself to a rod (92), (98) or (99) and to other seeds on the rod. Although there are only a few rods shown in FIG. 9, this embodiment preferably includes a large number of rods. The seeds coalesce to form a larger seed, become more buoyant, and eventually rise to the finer top surface. The rods (92), (98) and (99) are preferably either round or rectangular in cross-section and large enough in size to survive the viscous drag forces. The entrapment of seeds by this embodiment is similar to that of a furnace filter.

In all of the embodiments discussed thus far, the glass completely filled the finer, thus there was glass in contact with all the internal surfaces. In the prior art the glass often does not completely fill the finer, thus there is a free surface on the top surface of the glass flowing though the finer. This alters the flow distribution of the glass, as the top surface has no viscous drag to slow its velocity. The resultant fining performance of the finer, however, is not greatly influenced because, even though the top surface glass moves faster, the glass close to the walls moves slower. This is best shown in a square cross-section finer.

FIG. 10A shows a side view of the trajectory of seeds (47) rising in the rectangular finer (41) in FIG. 4B, in which the glass contacts all internal surfaces. The seeds rise at substantially the same speed so they move vertically faster when the glass is flowing slower near the bottom wall (106) next to the inlet (43) and near the top wall (108) next to the outlet (44).

FIG. 10B shows a side view of the seeds rising in the rectangular finer in an alternative embodiment of the present invention, in which the glass does not contact all the internal surfaces. More specifically, the glass has a free top surface (109) in this embodiment. The seeds move vertically faster when the glass is flowing slower near the bottom wall (106) at the inlet end (103) and move vertically slower as the seeds enter the faster flowing glass near the free surface (109). This can be seen when comparing the two seed trajectories (47) and (107). Although the paths are different, the end result (the horizontal distance for the seeds to rise vertically) is essentially the same.

A high aspect ratio finer in which the top surface of the glass is a free surface does not require the top surface of the finer to be made of a precious metal (platinum). The top surface could be made from a high performance refractory or if required, a refractory to which a thin layer of platinum is attached, i.e. flame sprayed. This allows the finer to have a greater cross-sectional area for flow, as only the finer bottom and sides require walls of platinum resistant to the presence of glass. Although this embodiment is shown in the Figures in reference to the finer with a rectangular cross section, manufacture of the top wall using a material other than a precious metal, or only a thin layer of a precious metal, is also applicable to the other cross-sectional shapes discussed herein.

FIG. 11A shows a finer (111), which has the same length as the finers in FIGS. 1B, 2B, 4B, 5B, 6B, 10A and 10B. It has no top surface and thus has been enlarged in cross-section such that it has a wetted perimeter of 91% of the finers in FIGS. 1B, 2B, 4B, 5B, 6B, 10A and 10B. The smaller wetted perimeter allows a short vertical distance on the sides above the expected glass top surface.

Figure 11B:
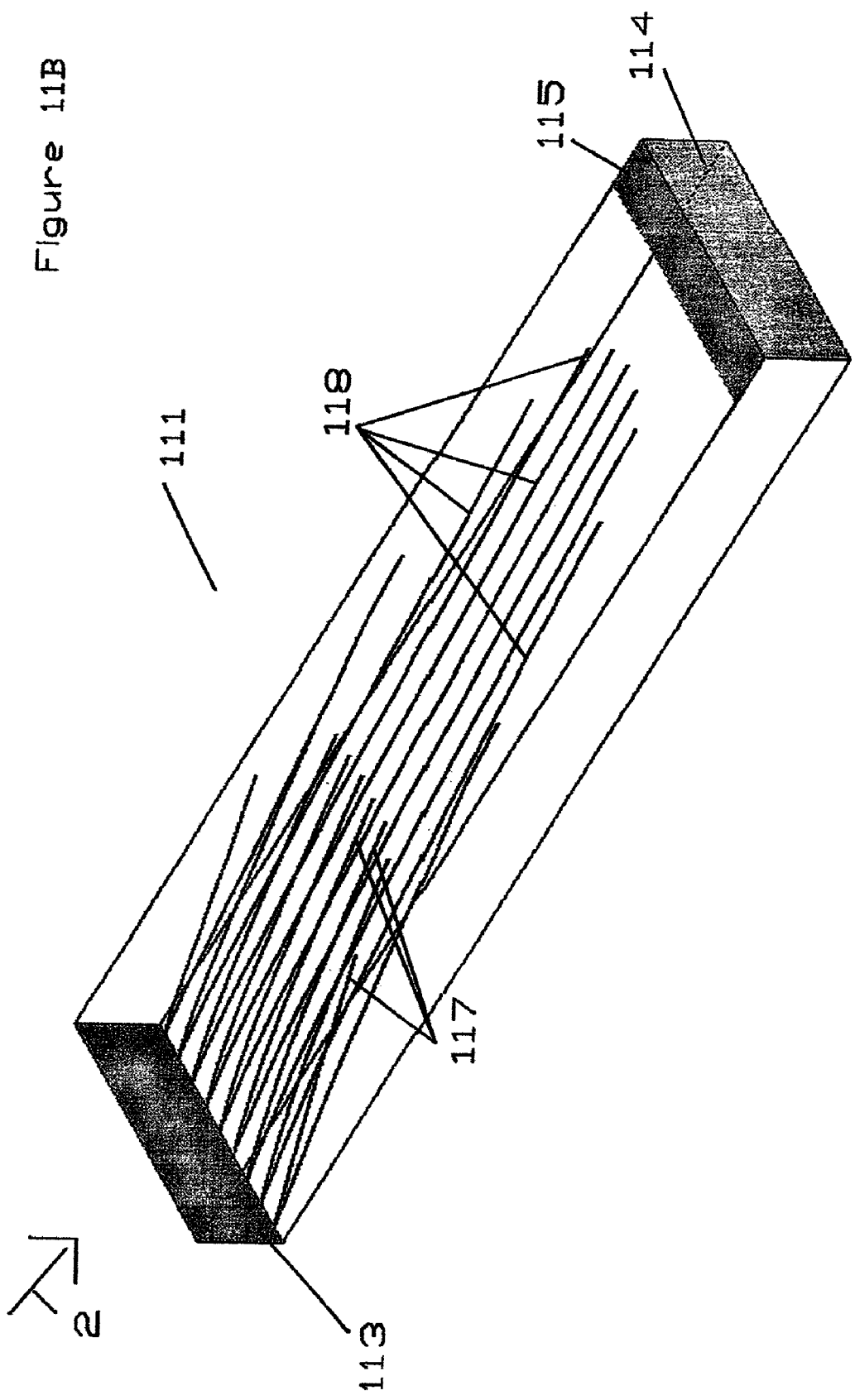
FIG. 11B shows the rising of seeds in the finer of FIG. 11A.

FIG. 11B shows the trajectories of two sets of seeds starting from the bottom of the inlet (113) in the finer of FIG. 11A. The first set of seeds (117) is the same diameter as those in FIGS. 1B, 2B, 4B, 5B, 6B, 10A and 10B, whereas the second set of seeds (118) has a diameter of 0.7 times the first set of seeds. Both sets of seeds rise to the top of the finer and thus dissipate to the atmosphere through a vent (115) at the outlet end (114) of the finer (111). The first set of seeds (117) rises in approximately one half the distance of the second set of seeds (118). This validates the diameter squared relationship for the speed of rise of a seed. This finer has the same precious metal cost as a finer of prior art and removes seeds which have a diameter equal to 70% of the diameter of the seeds removed by a finer of prior art. Optionally, the finer could be made shorter for lower construction cost and equal performance. This would be an economic decision based on the value of manufactured product produced from the glass with less and smaller seeds.

Other Shapes for the Finer

FIGS. 12A through 12H and FIGS. 13A through 13H show additional finer shapes that provide increased fining capability. In FIG. 12A through FIG. 12H, the top of the finer has a gabled roof shape that has an apex or ridge (123) with an obtuse included angle (120) to allow the seeds to migrate to the center of the finer where they will more easily be dissipated at the atmospheric vent. In some embodiments of this invention, the migration of the seeds to the apex (123) of the finer is enhanced by narrow fining ribs (136) attached to the top surfaces (121) of the finer. These fining ribs (136) also provide structural reinforcement of the finer top surface (121).

Figures 12A, 12B:
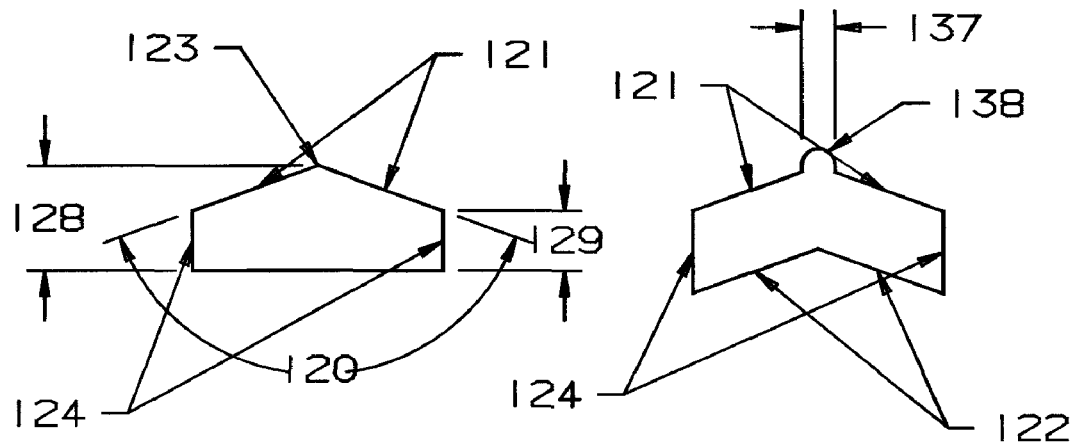
FIG. 12A shows a five sided gable roof finer cross-section in an embodiment of the present invention.
FIG. 12B shows a six sided gable roof finer cross-section in an embodiment of the present invention.
Figures 12C, 12D:
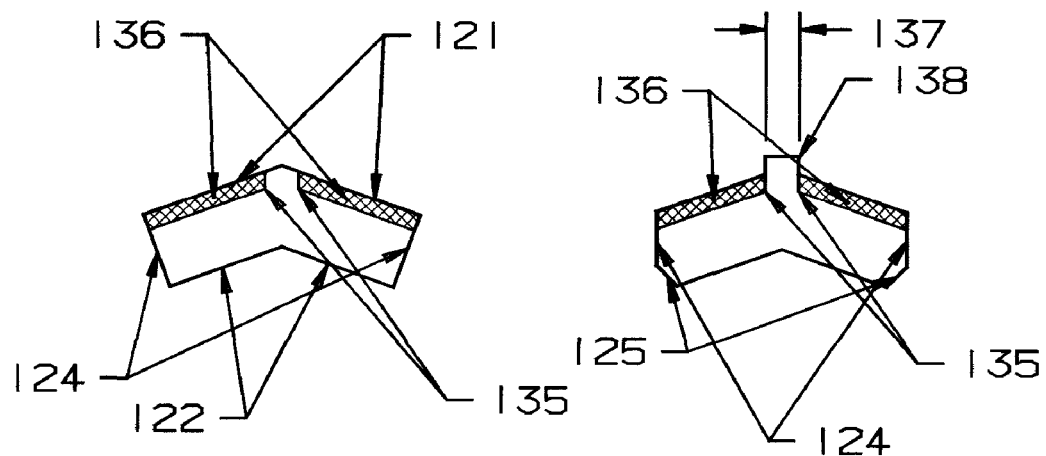
FIG. 12C shows a six sided gable roof finer cross-section with fining ribs in an embodiment of the present invention.
FIG. 12D shows a six sided gable roof finer cross-section with fining ribs and chamfered ends in an embodiment of the present invention.

FIG. 12A shows a finer cross-section that is pentagonal with a sloped gabled roof (121), which has an obtuse angle (120) at its center (123). The sides (124) of the cross-section are parallel. As the obtuse included angle (120) approaches 180 degrees, the general shape is substantially rectangular. The height at the center (128) is greater than the height at the ends (129). FIG. 12B shows a finer cross-section with six sides where the tops (121) and opposite bottoms (122) are parallel and the ends (124) are parallel. A roof vent (138) of width (137) is also provided. FIG. 12C shows a finer cross-section with six sides where the tops (121) and opposite bottoms (122) are parallel and the ends (124) are perpendicular to the tops and bottoms. Fining ribs (136) with a center opening (135) are also shown. FIG. 12D shows the cross-section of FIG. 12B with single chamfers (125) at the ends (124). Fining ribs (136) with a center opening (135) are also shown. A roof vent (138) of width (137) is also provided. FIG. 12E has six sides and radiused (126) ends (124), where the top radii (126) and the bottom radii (126) are of different sizes. The tops (121) and the bottoms (122) of FIG. 12E are not parallel and the bottoms (122) are angled such that the height (128) at the center (123) is less than the height (129) at the ends (124). FIG. 12F shows the cross-section of FIG. 12B with chamfered (125) top ends and radiused (126) bottom ends (124). A roof vent (138) is also provided. FIG. 12G shows the cross-section of FIG. 12C with fully radiused (126) ends (124). FIG. 12G also has a horizontal bottom section (127) such that the height (128) at the center is greater than the height (129) at the ends (124). FIG. 12H shows the cross-section of FIG. 12D with chamfered (125) ends (124), where the chamfers are of different sizes. A roof vent (138) is also provided.

In FIGS. 13A through 13H, the top of the finer has a gothic arch shape (131), which has an apex (123) to allow the seeds to migrate to the apex (123) of the finer where they will more easily be dissipated at the atmospheric vent. In some of the preferred embodiments of this invention, the migration of the seeds to the apex (123) of the finer is enhanced by narrow ribs (136) attached to the top surfaces (131) of the finer. These fining ribs (136) also provide structural reinforcement of the finer top surface (131).

The gothic arch shape (131) is a structural improvement over the straight sided top surfaces (121) of FIGS. 12A through 12H. At the high temperature of operation, a straight sided unsupported platinum roof (121) of the finer has the tendency to deform. In contrast, a gothic arch (131) has a natural structural stiffness that resists deformation. A finer, where there is no internal glass free surface, would primarily have a deformation problem during start-up conditions because, once the finer is full of glass, the hydrostatic heat of the glass in the finer provides a force to make the platinum press against the refractory backing material. The deformation of the top surface (121) and (131) is most critical for a finer where the glass has an internal glass free surface.

The top surfaces (131) in FIG. 13A have the shape of a gothic arch with an obtuse included angle (120) at the apex or ridge (123), an obtuse included angle (130) at the ends (124), a flat bottom (132), and parallel ends (124). FIG. 13B has top surfaces (131) the shape of a gothic arch with the bottom surfaces (132) having a contour which is equidistant from the top surfaces (131), parallel ends (124) and an apex vent (also called a ridge vent (138)) of width (137) at the apex (123). FIG. 13C has top surfaces (131) the shape of a gothic arch with the bottom surfaces (132) having a contour which is equidistant from the top surfaces (131) and ends (124) that form a right angle with the bottom surfaces (132). FIG. 13C also has a horizontal bottom section (127) such that the height (128) at the center is greater than the height (129) at the ends (124). Fining ribs (136) with a center opening (135) and an apex vent (138) are also shown. FIG. 13D shows the cross-section of FIG. 13B with single chamfers (125) at the ends (124). Fining ribs (136) with a center opening (135) and an apex vent (138) are also shown. FIG. 13E has top surfaces (131) the shape of a gothic arch with a contoured bottom surface (132) which is has a vertical distance (128) from the apex (123) which is less than the height (129) at the ends (124) and has radiused ends (126) of different radii. FIG. 13F shows the cross-section of FIG. 13B with chamfered (125) top ends and radiused (126) bottom ends (124). FIG. 13G shows the cross-section of FIG. 13C with fully radiused (126) ends (124). FIG. 13H shows the cross-section of FIG. 13D with chamfered (125) ends (124) where the chamfers are of different sizes. In FIG. 13H, fining ribs (136) without a center opening and an apex vent (138) with width (137) are also shown.

FIGS. 12F, 12H, 13F, and 13H show a structural element (139) connecting the top surfaces (121). This structural element maintains a constant width (137) of the apex vent. In a preferred embodiment, the structural elements (139) are webs with the web surfaces parallel to the direction of glass flow. The webs (139) are spaced at intervals along the apex (123) to provide the required structural strength. In another preferred embodiment the webs extend the distance between the fining ribs (136), but have openings at the fining ribs to allow the seeds to move from the fining rib (136) into the apex vent (138). In another preferred embodiment, the structural elements are struts spaced along the apex (123) at intervals to provide the required structural strength.

Fining Ribs

The fining ribs (136) shown in FIGS. 12C, 12D, 12H, 13C, 13D, and 13H trap seeds moving in the direction of glass flow along the top surfaces (121) of the finer. The fining ribs (136) are a specific configuration of a baffle. The fining ribs are attached primarily to the top surfaces (121) of the finer and extend down from the top surface approximately 5 to 40 percent of the height (128) of the finer. In addition to trapping seeds, they also provide structural reinforcement to the top surface of the finer. The seeds that are trapped agglomerate into larger seeds and then migrate by buoyant force toward the ridge or apex (123). In FIGS. 12C, 12D, 13C, and 13D, the fining rib is shown as ending at the edge (135) of the roof vent (138) where the seeds rise into the roof vent (138) and migrate in the direction of glass flow to the atmospheric vent at the outlet end of the finer. In FIGS. 12H and 13H, the fining rib (136) extends across the apex (123) of the finer and provides structural stiffness in the manner of the structural element (129). The top of the fining rib (135) is open to the apex vent (138) such that the seeds rise into the roof vent (138) and migrate in the direction of glass flow to the atmospheric vent at the outlet end of the finer.

Apex Vent

The apex vents (138) shown in FIGS. 12B, 12F, 13B, and 13H have a radiused cross-section, whereas the apex vents (138) shown in FIGS. 12D, 12H, 13D, and 13H have a rectangular cross-section. The cross-section may alternatively be triangular, trapezoidal, or pentagonal, etc. with radiused or chamfered corners. The apex vent (138) works in combination with the fining ribs (136) to allow the easy migration of seeds, which have moved to the apex (123) area through the action of the fining ribs (138), to the vent at the exit end of the finer. In FIGS. 14A, 14B, 14C, 15A, 15B, 16A, 16B, 17A, and 17B, the paths of the seeds are illustrated by a series of dots. The distance between the dots is representative of the speed of the seeds through the finer. Dots that are far apart are rising in the free stream of glass flow, whereas the dots that are joined represent motion at the top surface of the finer.

Figure 14A:
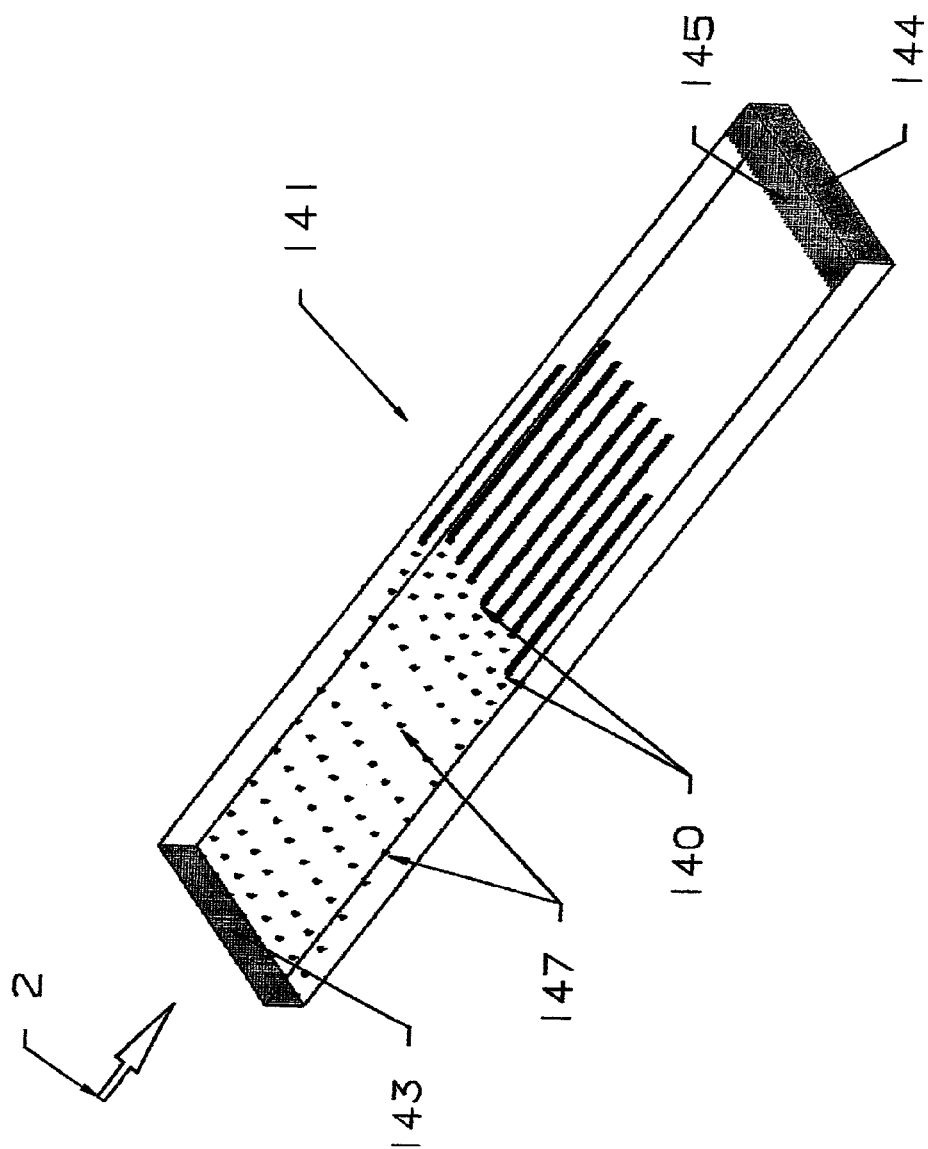
FIG. 14A shows the paths of 0.0007 meter diameter seeds in a rectangular finer.
Figure 14B:
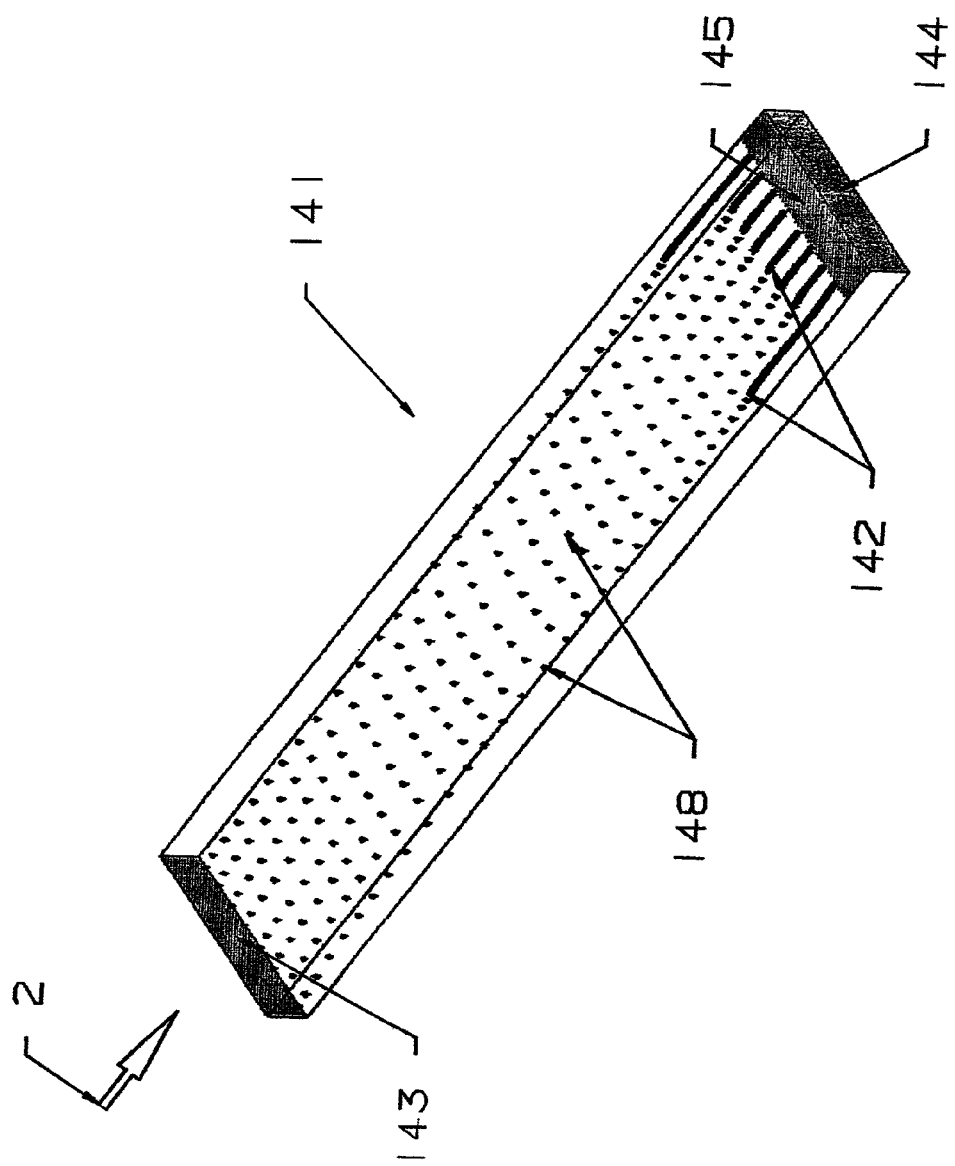
FIG. 14B shows the paths of 0.00049 meter diameter seeds in a rectangular finer.
Figure 14C:
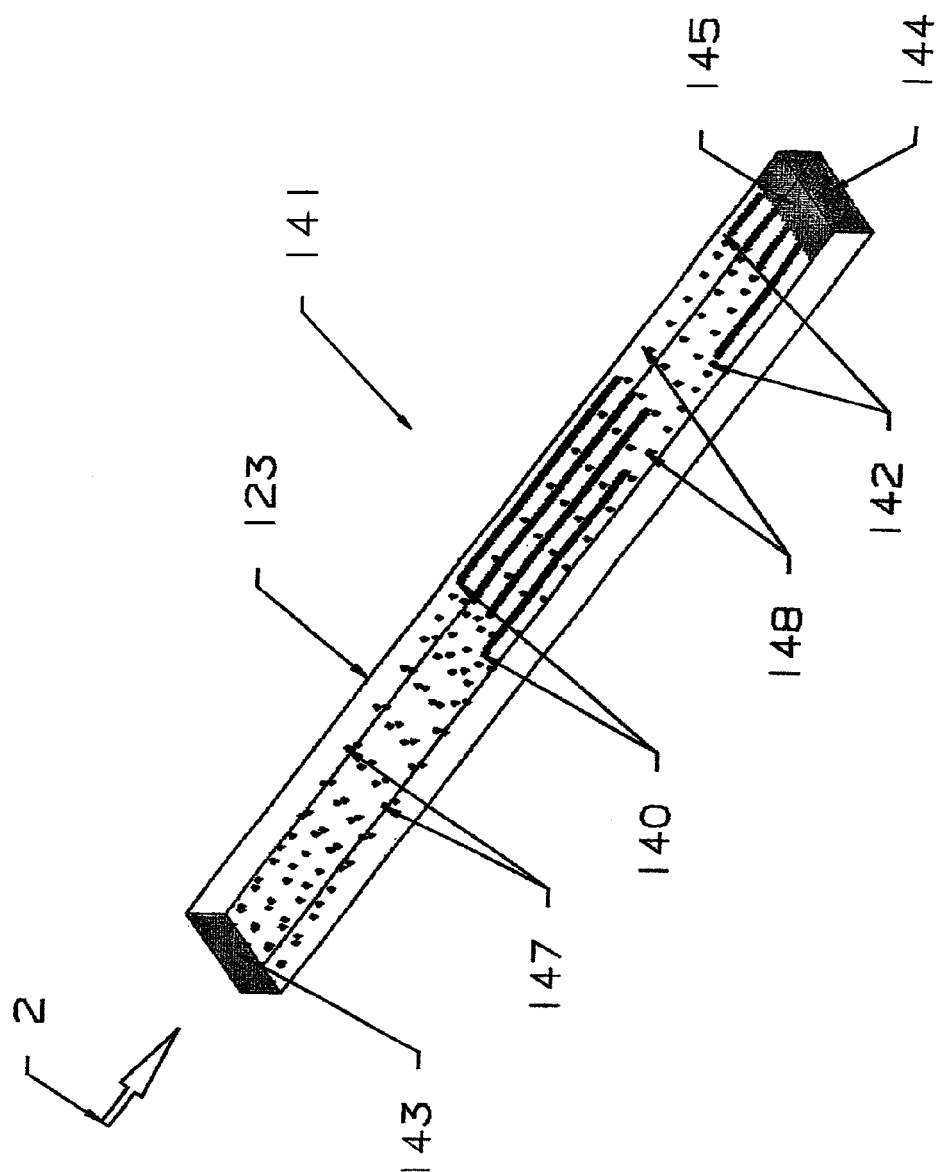
FIG. 14C shows the paths of 0.0007 meter diameter and 0.00049 meter diameter seeds in one side of the rectangular finer shown in FIGS. 14A and 14B.

In FIGS. 14A, 14B, and 14C the molten glass (2) enters the finer at the inflow end (143) and exits the finer at the outlet (144). The seeds that are fined from the glass exit to the atmosphere at the vent (145). The seeds ascend to the top surface (121) at points (140) and (142) respectively of the finer. FIG. 14A shows the paths of seeds in a rectangular finer with an aspect ratio of 6. The diameter of the seeds (147) is 0.0007 meters and is the same as shown in FIGS. 1B, 2B, 4B, 5B, 6B, 7B, 8B, 10A, and 10B. FIG. 14B shows the paths of seeds (148) with diameters of 0.00049 meters in a rectangular finer with an aspect ratio of 6. The seeds (148) of FIG. 14B reach the top surface of the finer in twice the distance of the seeds (147) of FIG. 14A because the vertical speed of a seed in glass is proportional to its diameter squared. The surface area of platinum in the finers in FIGS. 14A and 14B is the same as in the finers shown in FIGS. 1A, 1B, 2A, 2B, 4A, 4B, 5A, 5B, 6A, 6B, 10A, 10B, 11A, and 11B. The fining the high aspect ratio finer (141) in FIGS. 14A and 14B can be compared with the circular finer with an aspect ratio of 1 in FIG. 1B and the square cross-section finer with an aspect ratio of 1 shown in FIG. 2B. The performance of a high aspect ratio finer is on the order of twice that of a finer with an aspect ratio of 1 from the prior art.

FIG. 14C shows the fining of one half of the finer in FIGS. 14A and 14B and is used as a base for comparison with FIGS. 15A, 15B, 16A, 16B, 17A, and 17B. It is divided on the longitudinal centerline (123), and centerline symmetry is assumed. The paths for two diameters of seeds 0.0007 meters (147) and 0.00049 meters (148) are shown. The location of the apex (123) and the longitudinal centerline (123) are identical.

FIGS. 15A, 15B, 16A, 16B, 17A, and 17B show the fining performance of gabled roof finers with the cross-section shown in FIG. 12C, different roof apex angles (120), and an aspect ratio of 6. One half of the finer cross-section is shown as centerline symmetry is assumed. For these gabled roof examples, a rectangular coordinate model is rotated the required angle. This does not give an exact result at the finer centerline; however, the modeling error at other locations is negligible.

Figure 15A:
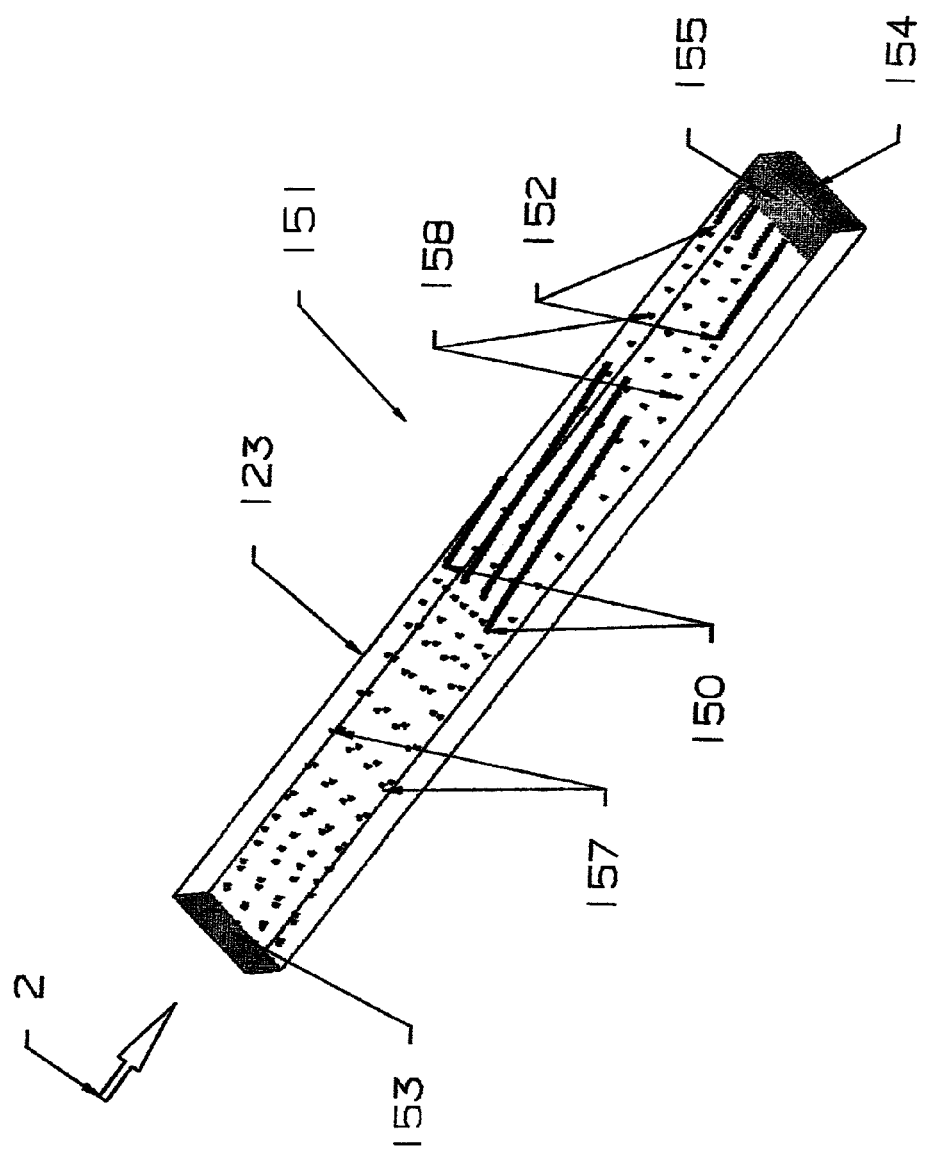
FIG. 15A shows the paths of seeds in a 10 degree gabled roof finer without fining ribs.
Figure 15B:
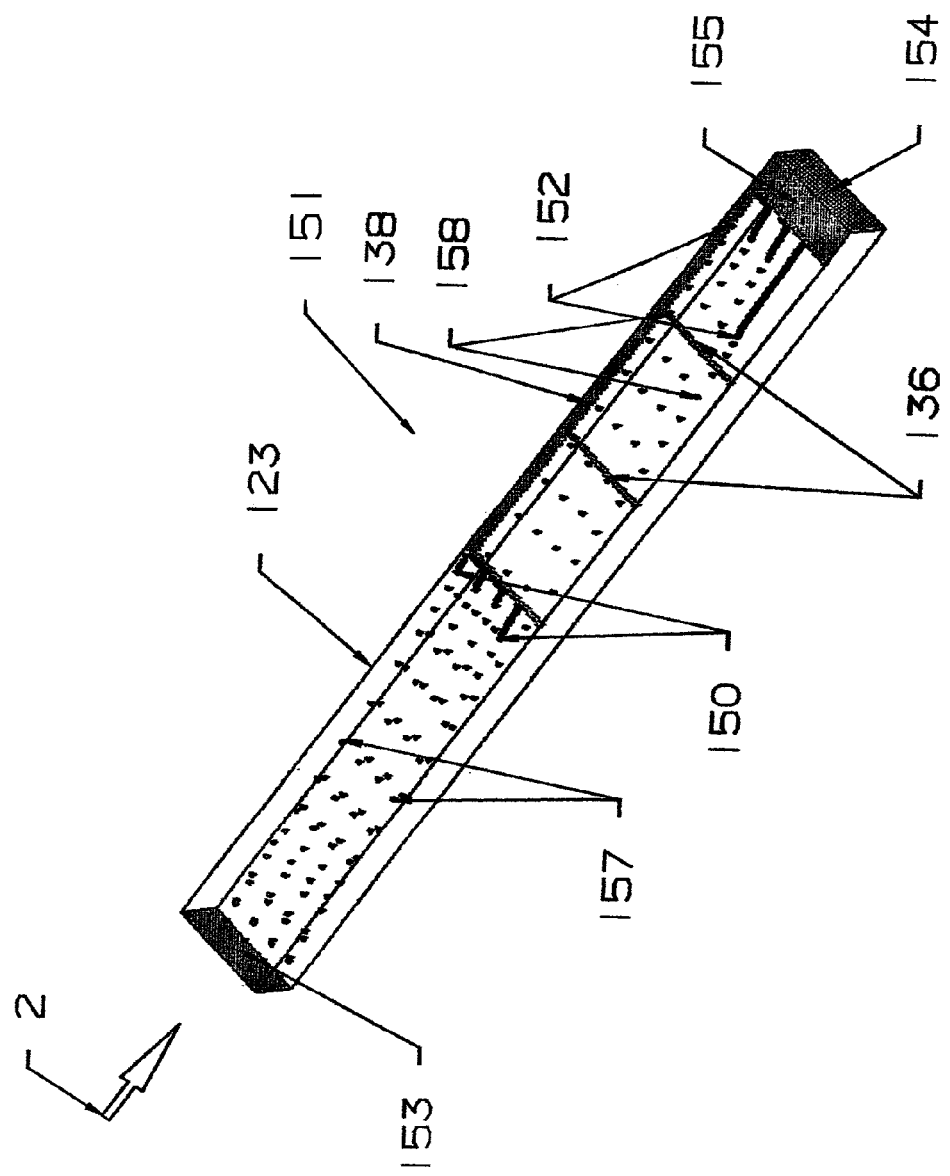
FIG. 15B shows the paths of seeds in a 10 degree gabled roof finer with fining ribs.

In FIGS. 15A and 15B the molten glass (2) enters the finer at the inflow end (153) and exits the finer at the outlet (154). The seeds that are fined from the glass exit to the atmosphere at the vent (155). FIG. 15A shows the paths of two different diameter seeds (157) and (158) in one half a gabled roof finer with a top surface (121) slope of 10 degrees (obtuse included angle (120) of 160 degrees) and with no internal fining ribs.

Note that when the seeds (157) and (158) ascend to the top surface (121) at points (150) and (152) respectively of the finer, they slowly migrate toward the apex (123) of the finer.

FIG. 15B shows the paths of two different diameter seeds (157) and (158) in one half a gabled roof finer with a top surface (121) slope of 10 degrees (obtuse included angle (120) of 160 degrees), with internal fining ribs (136) and with an apex vent (138). Note that when the seeds (157) and (158) ascend to the top surface (121) at points (150) and (152) respectively of the finer they slowly migrate toward the apex (123) of the finer until they encounter the fining rib (136). The seeds then move along the fining rib (136) toward the apex (123) of the finer until they reach the apex vent (138) at the center of the finer at which time they enter the apex vent (138). The fining performance of the 10 degree (obtuse included angle (120) of 160 degrees) top surface (121) slope shown in FIG. 15B is substantially the same as that of the 0 degree top surface (121) slope shown in FIG. 14B as points (150) and (152) are at almost the same location downstream in finer (151) than points (140) and (142) are in finer (141).

Figure 16A:
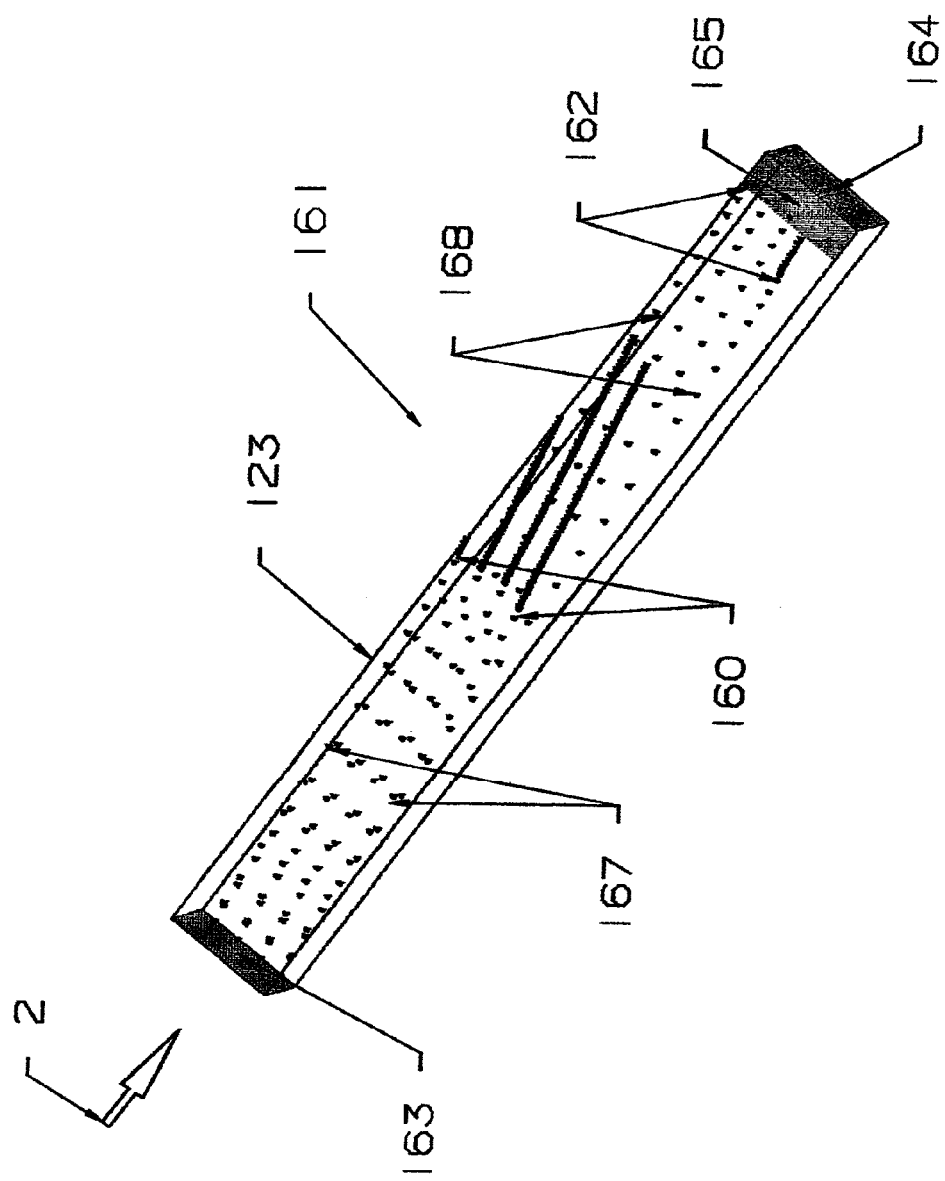
FIG. 16A shows the paths of seeds in a 20 degree gabled roof finer without fining ribs.
Figure 16B:
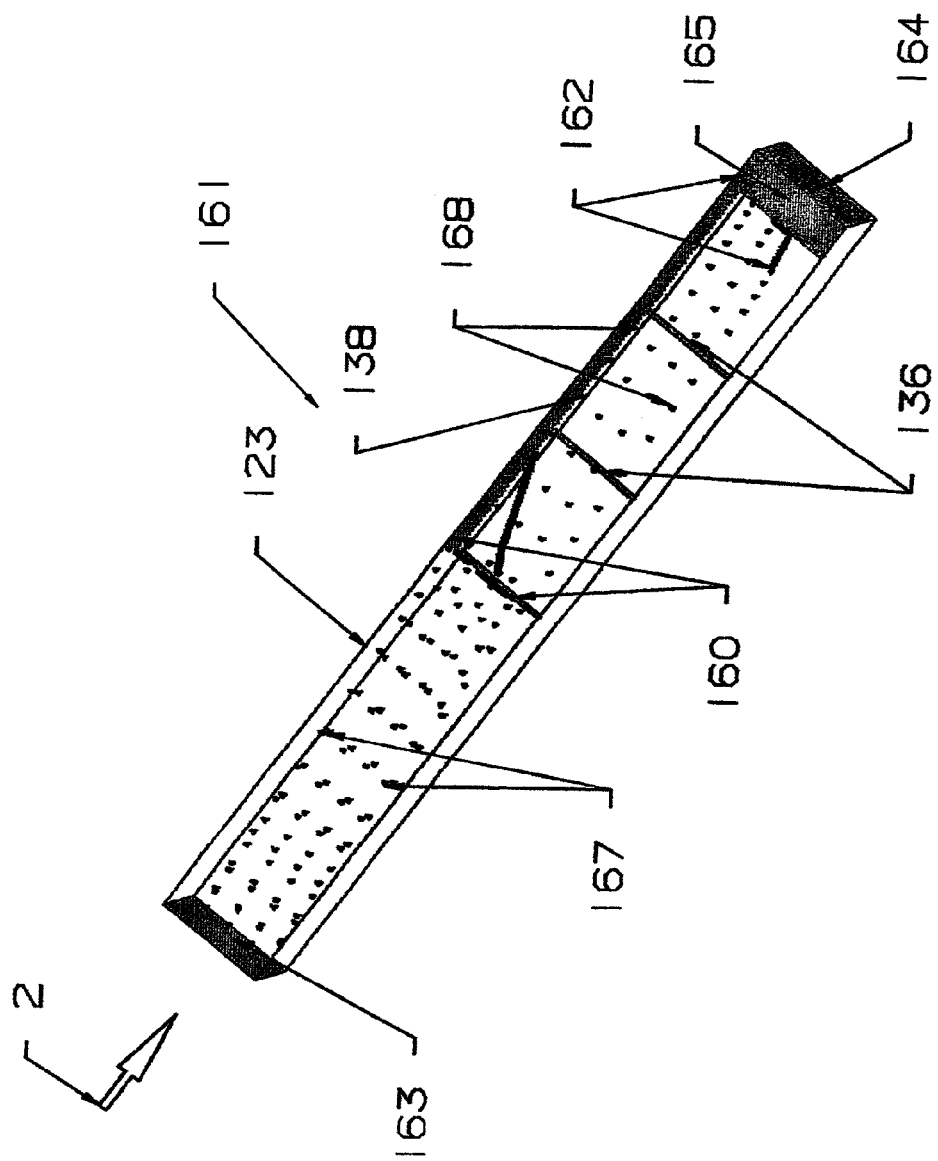
FIG. 16B shows the paths of seeds in a 20 degree gabled roof finer with fining ribs.

In FIGS. 16A and 16B the molten glass (2) enters the finer at the inflow end (163) and exits the finer at the outlet (164). The seeds that are fined from the glass exit to the atmosphere at the vent (165). FIG. 16A shows the paths of two different diameter seeds (167) and (168) in one half a gabled roof finer with a top surface (121) slope of 20 degrees (obtuse included angle (120) of 140 degrees) and with no internal fining ribs. Note that when the seeds (167) and (168) ascend to the top surface (121) at points (160) and (162) respectively of the finer they slowly migrate toward the apex (123) of the finer.

FIG. 16B shows the paths of two different diameter seeds (167) and (168) in one half a gabled roof finer with a top surface (121) slope of 20 degrees (obtuse included angle (120) of 140 degrees), with internal fining ribs (136) and with an apex vent (138). Note that when the seeds (167) and (168) ascend to the top surface (121) at points (160) and (162) respectively of the finer they slowly migrate toward the apex (123) of the finer until they encounter the fining rib (136). The seeds then move along the fining rib (136) toward the apex (123) of the finer until they reach the apex vent (138) at the center of the finer at which time they enter the apex vent (138). The fining performance of the 20 degree top surface (121) slope shown in FIG. 16B is marginally poorer than that of the 10 degree top surface (121) slope shown in FIG. 15B as points (160) and (162) are slightly further downstream in finer (161) than points (150) and (152) are in finer (151).

Figure 17A:
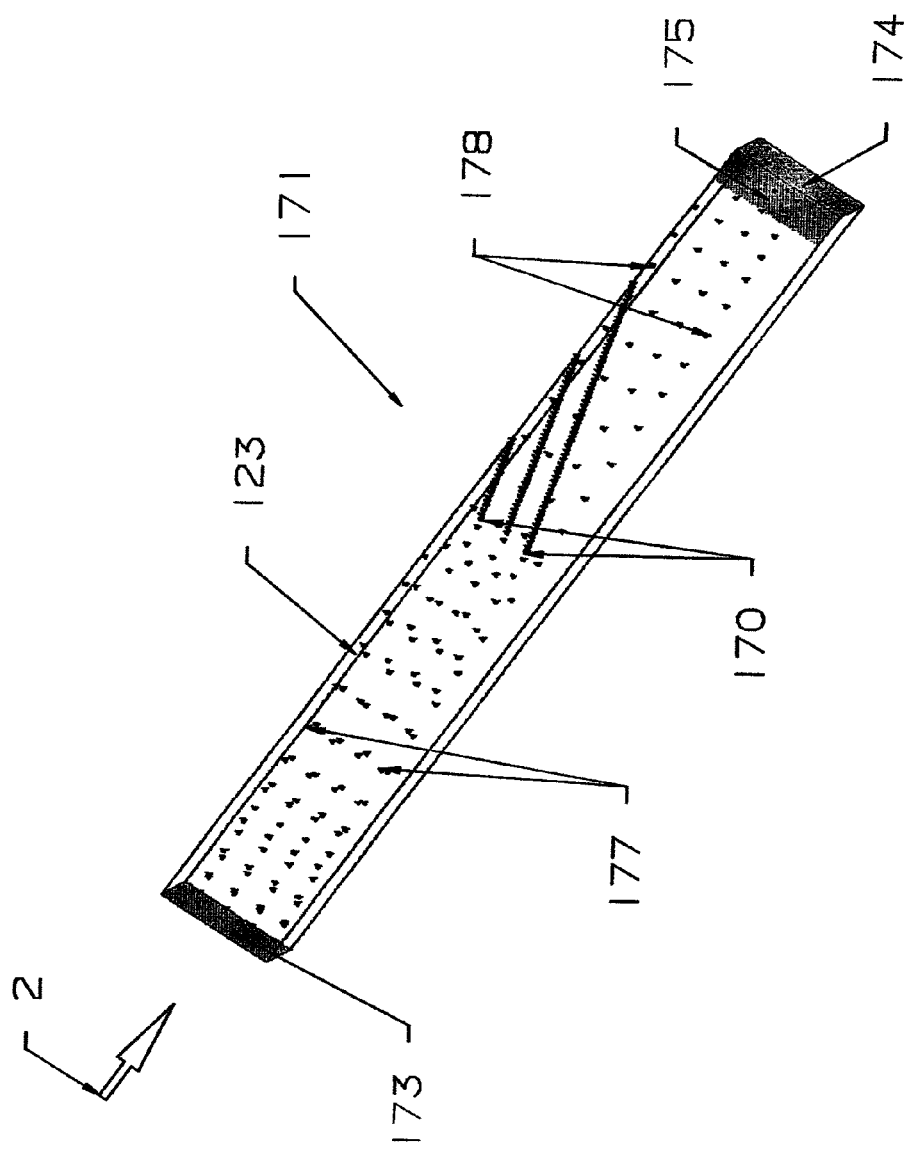
FIG. 17A shows the paths of seeds in a 30 degree gabled roof finer without fining ribs.
Figure 17B:
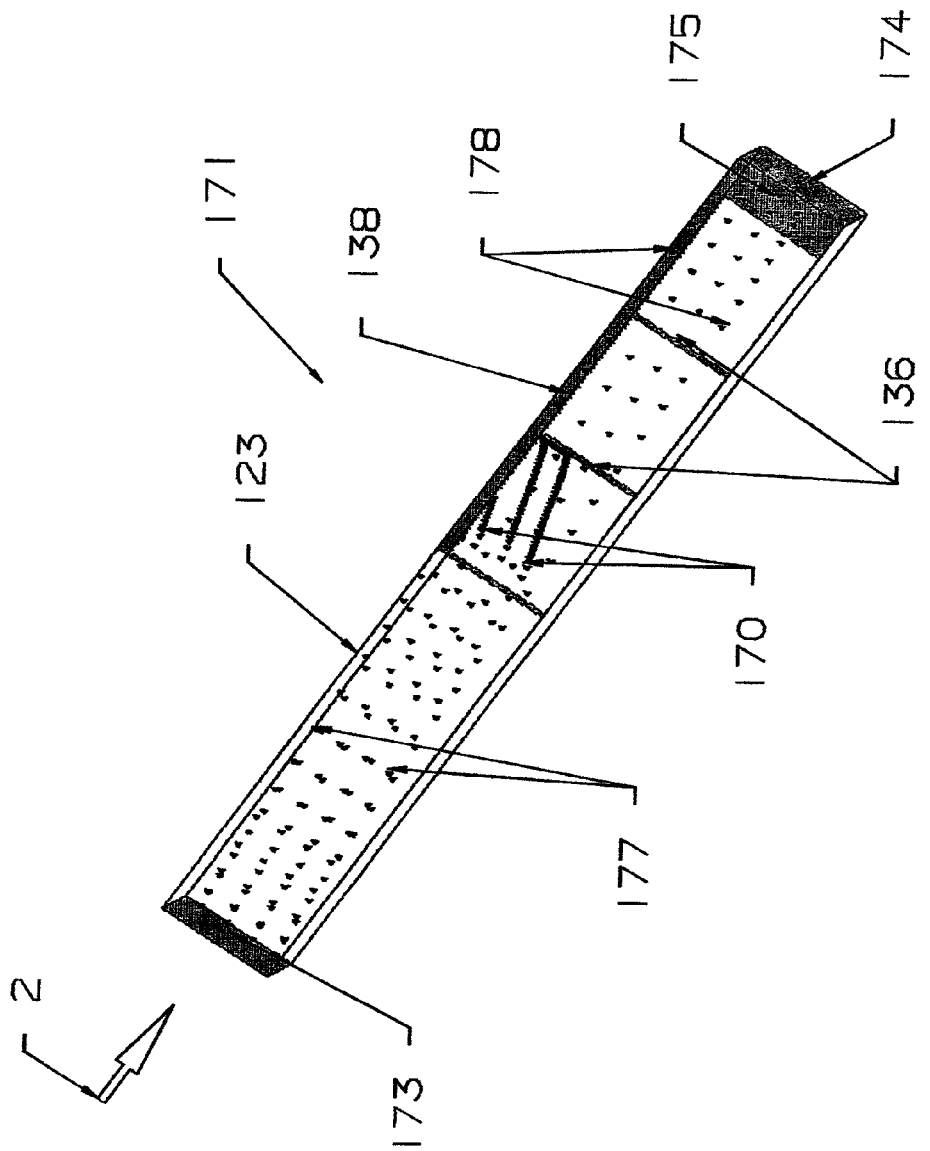
FIG. 17B shows the paths of seeds in a 30 degree gabled roof finer with fining ribs.

In FIGS. 17A and 17B the molten glass (2) enters the finer at the inflow end (173) and exits the finer at the outlet (174). The seeds that are fined from the glass exit to the atmosphere at the vent (175). FIG. 17A shows the paths of two different diameter seeds (177) and (178) in one half a gabled roof finer with a top surface (121) slope of 30 degrees (obtuse included angle (120) of 120 degrees) and with no internal fining ribs. Note that, when the seeds (177) ascend to the top surface (121) at points (170) of the finer, they slowly migrate toward the apex (123) of the finer. None of the seeds in the group (178) reach the top surface of the finer. The seeds in this group exit the finer at the outlet (174) and would be defects in the manufactured product.

FIG. 17B shows the paths of two different diameter seeds (177) and (178) in one half a gabled roof finer with a top surface (121) slope of 30 degrees (obtuse included angle (120) of 120 degrees), with internal fining ribs (136), and with an apex vent (138). Note that when the seeds (177) ascend to the top surface (121) at points (170) of the finer, they slowly migrate toward the apex (123) of the finer until they encounter the fining rib (136). The seeds then move along the fining rib (136) toward the apex (123) of the finer until they reach the apex vent (138) at the center of the finer at which time they enter the apex vent (138). None of the seeds in the group (178) reach the top surface of the finer. The seeds in this group exit the finer at the outlet (174) and would be defects in the manufactured product. The fining performance of the 30 degree top surface (121) slope shown in FIG. 17B is notably poorer than that of the 20 degree top surface (121) slope shown in FIG. 16B as points (170) are further downstream in the finer (171) than points (160) are in the finer (161) and the seeds in group (178) exit the finer and are defects in the product. Top surface slopes of 10 degrees, 20 degrees, and 30 degrees, convert to obtuse included angles (120) of 160 degrees, 140 degrees, and 120 degrees respectively. A preferred embodiment of a gabled roof finer would have an obtuse included angle (120) of 140 degrees. Obtuse included angles (120) between 190 degrees and 90 degrees are also within the spirit of the present invention.

FIGS. 15A, 15B, 16A, 16B, 17A, and 17B show the fining performance of six sided gabled roof (121) finers with different top surface slopes and with bottom sides parallel to the top sides and ends with no chamfer or radius which is the cross-section shown in FIG. 12C. The performance of the gothic arch roof (131) finers can be extrapolated from the results of these examples. A preferred embodiment gothic arch has an apex obtuse included angle (120) of 160 degrees and an end obtuse included angle (130) of 130 degrees. Additional obtuse included angles, in the range of 178 degrees to 130 degrees for the apex obtuse included angle (120) and 160 degrees to 90 degrees for the end obtuse included angle (130), are also within the spirit of the present invention.

Apex Vent Exit

The apex vent (138) is a tunnel along the top of the finer, which facilitates the migration of the seeds to the finer vent (5) at the exit of the finer. During the migration of the seeds the small seeds agglomerate into larger seeds. The exit of the apex vent (138) has a special shape which promotes the discharge of large seeds and has a pointed top to minimize the formation of small seeds from the large seeds.

Fining Ribs at an Acute Angle to the Glass Flow

Figure 18A:
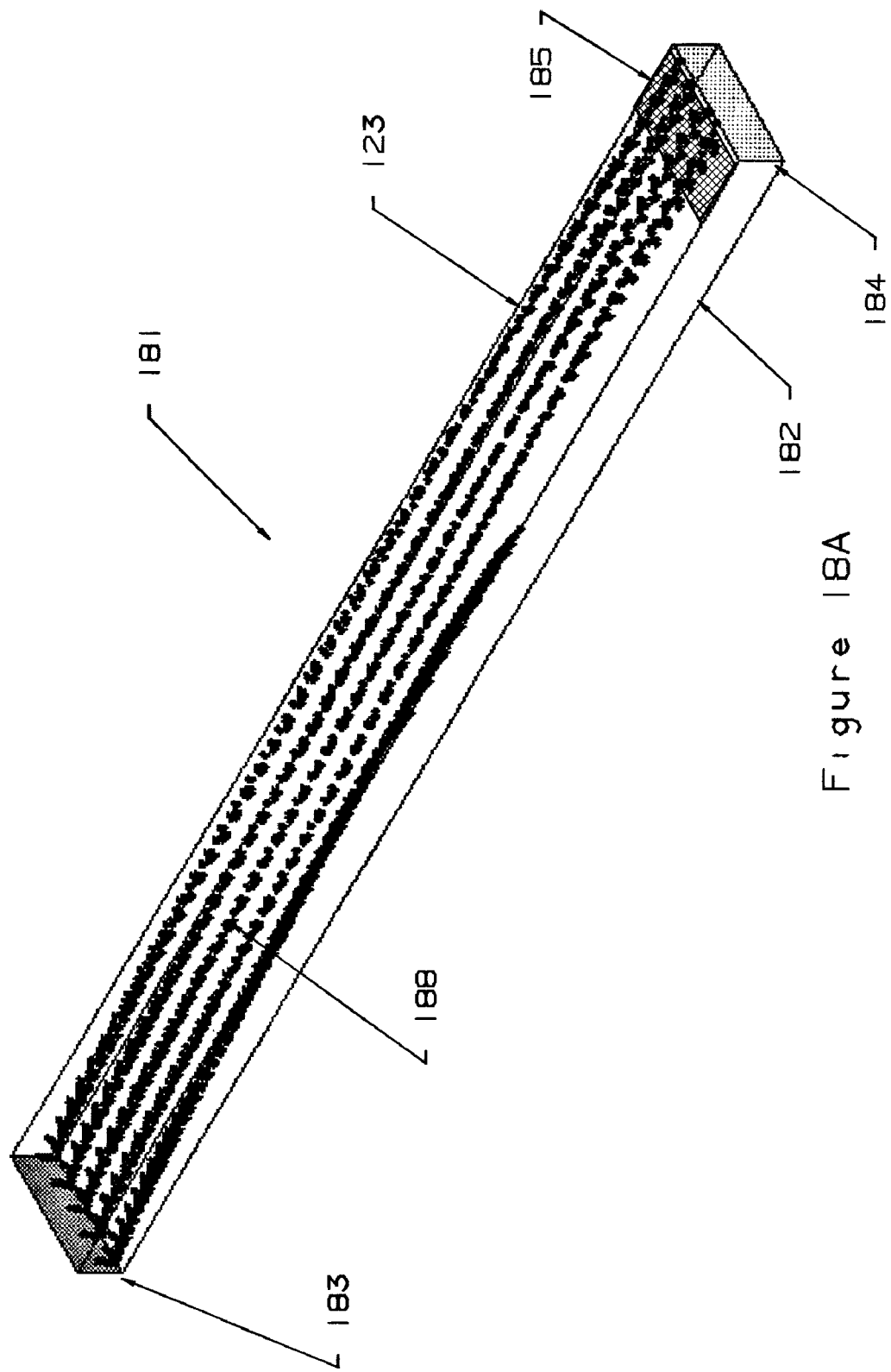
FIG. 18A shows the paths of seeds in a free surface finer with an aspect ratio of 8 without fining ribs.

FIG. 18A shows the paths of seeds (188) in a free surface rectangular finer with an aspect ratio of 6. One half the finer is shown as symmetry at the center (123) is assumed. The molten glass (2) enters the finer (181) at the inflow end (183). The seeds (188) rise vertically and continue to the exit (184) without substantial movement toward the center (123). In this instance, the exit vent (185) must be across the full width of the finer to dispose of the seeds (188) that move near the outer edge of the finer (182). With some glasses the seeds form a foam which must be mechanically, hydrodynamically, pneumatically, or thermally dissipated such that the gasses are effectively vented to the atmosphere. Procedures for removing the foam are covered in U.S. Pat. No. 6,854,290, incorporated herein by reference. The implementation of these procedures would preferably encompass the full width of the finer to completely dissipate the foam.

Figure 18B:
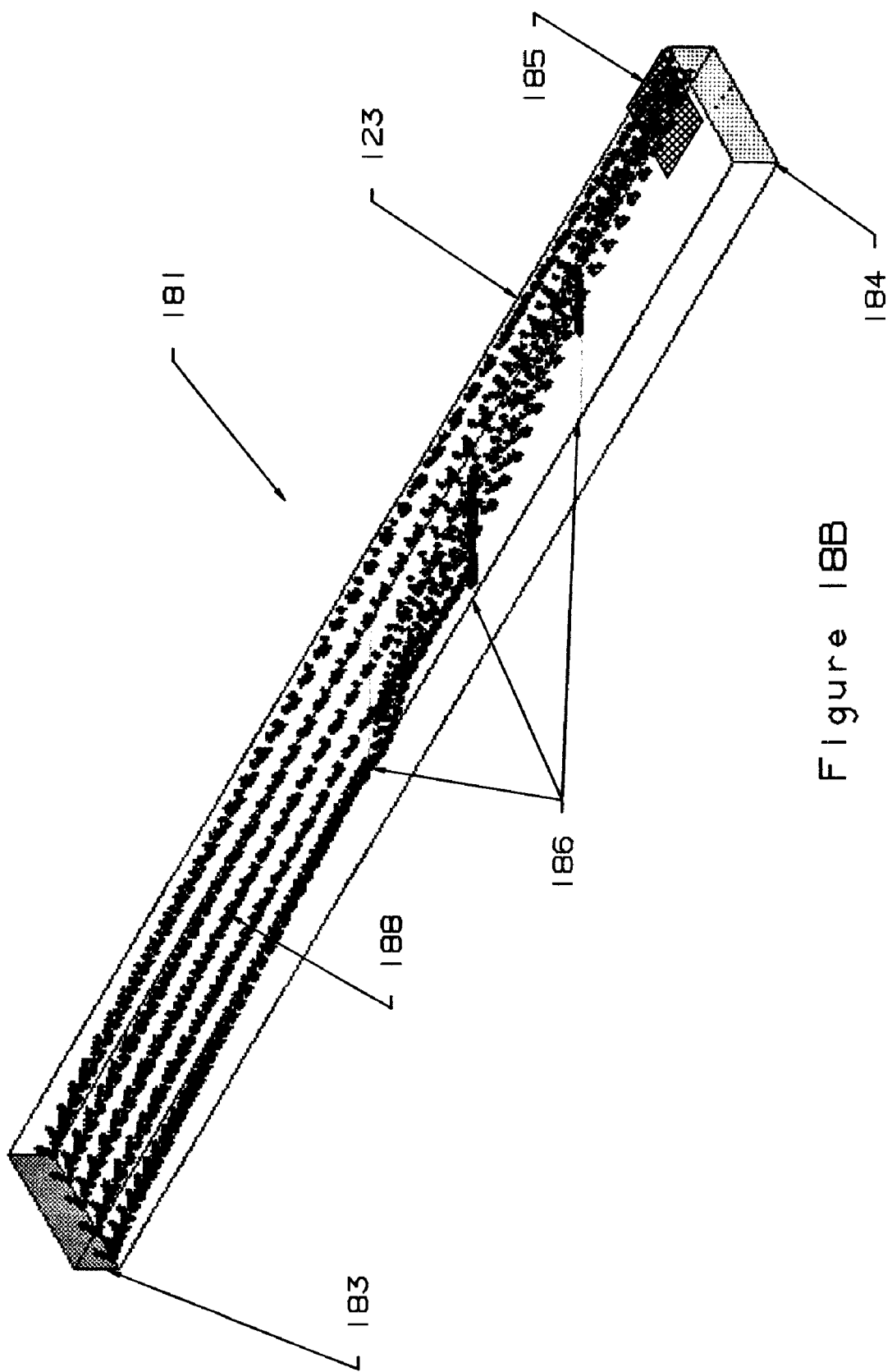
FIG. 18B shows the paths of seeds in an aspect ratio of a free surface finer with fining ribs set at an acute angle to the glass flow.

FIG. 18B shows an embodiment of this invention whereby the seeds (188) that are near to or at the surface are herded toward the center (123) of the finer by baffles (186) which are set at an acute angle to the glass flow and are partially immersed in the free surface of the glass. The baffles (186) or fining ribs (186) shown are attached to the top surface of the finer and are immersed in the top surface of the glass to about 10 percent of the glass depth. Glass immersions of approximately 5 to 40 percent of the glass depth would be effective. The angle of the fining ribs (186) shown is 60 degrees with respect to the centerline (123) of the finer which is parallel to the direction of the flow of glass in the finer. A range of angles from 5 to 85 degrees with respect to the centerline (123) of the finer would be effective depending on the glass and the configuration of the finer. This embodiment concentrates the seed (188) or foam defects at the center of the finer vent (185). In this embodiment, the finer vent (185) need not encompass the full width of the finer. The baffles (186) arranged at an acute angle with respect to the glass flow are particularly effective in a vacuum finer such as that described in U.S. Pat. No. 6,854,290.

Shapes using Radii and Chamfers to Increase Fining Efficiency

Figure 19A:
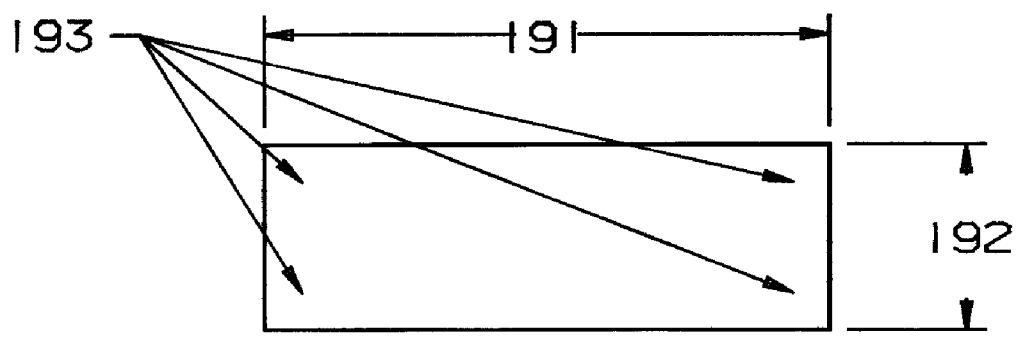
FIG. 19A shows the areas of slow viscous glass flow in a quadrilateral finer.
Figure 19B:
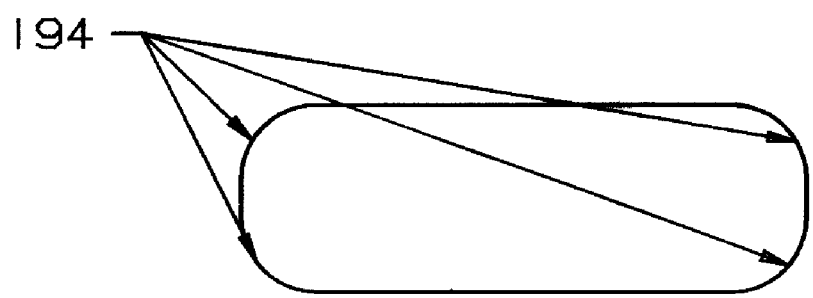
FIG. 19B shows the reduction in the area of slow viscous glass flow in a quadrilateral finer with corner radii.
Figure 19C:
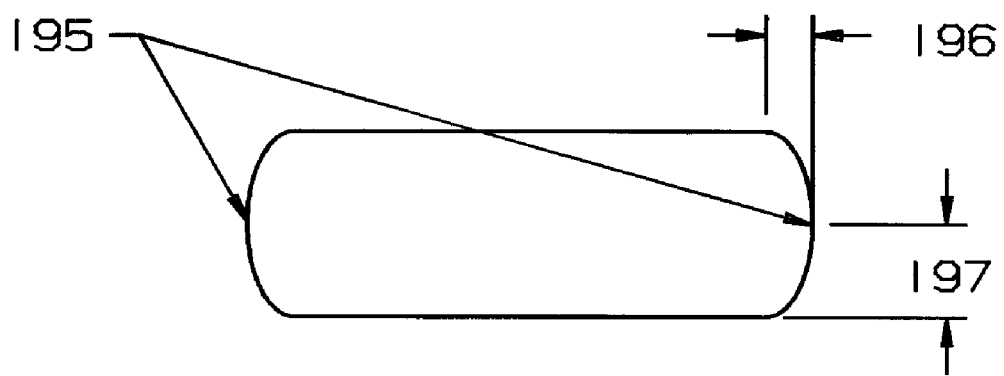
FIG. 19C shows the use of semi-elliptic end caps in high aspect ratio finers.

The radii and chamfers, illustrated in FIG. 3E, provide another way to increase fining efficiency. Referring to FIGS. 19A and 19B, FIG. 19A is a quadrilateral (rectangular) finer cross-section with an aspect ratio of 3, (distance (191) divided by distance (192)). The glass flow in the right angled corners (193) is very slow (quiescent) because of the close proximity of the sides of the right angle. FIG. 19B shows the replacement of the right angles with curves, or radii (194) equal to 40 percent of the height (192) of the finer cross-section. This use of corner radii reduces the quantity of precious metal (platinum or platinum alloy) required to construct the finer with virtually no change in the macroscopic flow characteristics of the finer. FIG. 19C shows semi-elliptical ends (195) for a high aspect ratio finer. The range of the ratio of minor semi axis (196) to major semi axis (197) of semi-ellipses is preferably 1.0 to 0.4, with a preferred ratio of 0.7. FIG. 20A through FIG. 23C illustrate various options for accomplishing the same effect as the radii (194) in FIG. 19B and the semi-ellipses (195) of FIG. 19C.

Figure 20A:
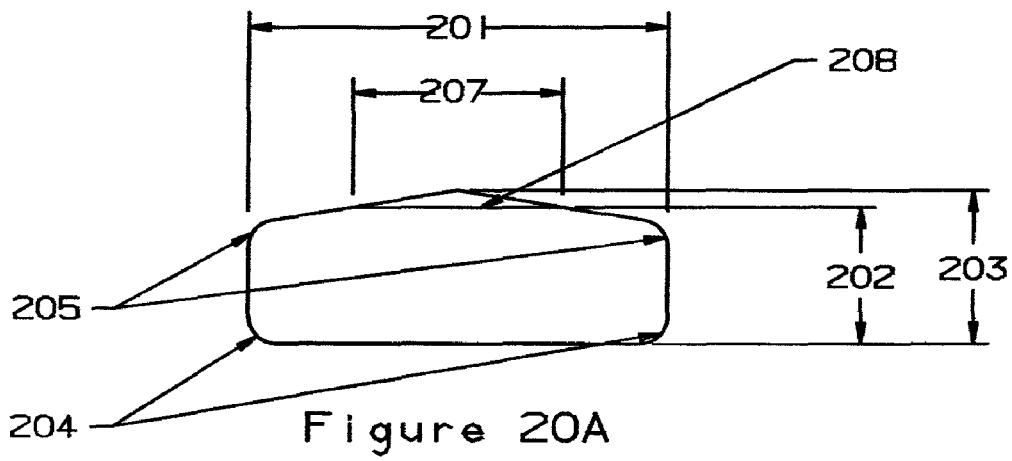
FIG. 20A shows one use of radii in a high aspect ratio enclosed finer.
Figure 20B:
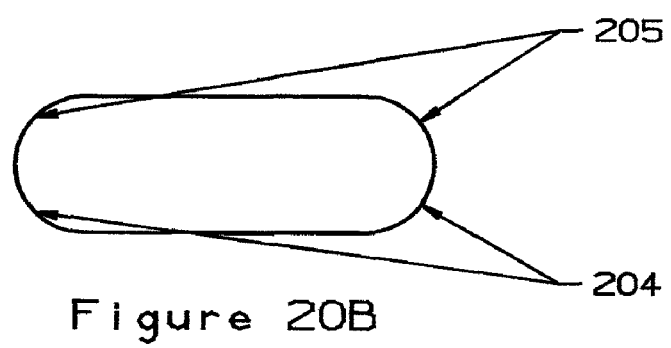
FIG. 20B shows another use of radii in a high aspect ratio enclosed finer.
Figure 20C:
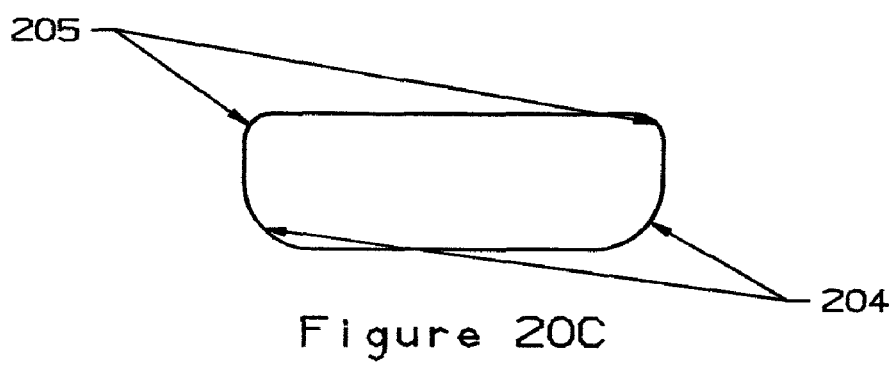
FIG. 20C shows another use of radii in a high aspect ratio enclosed finer.

FIGS. 20A, 20B, and 20C show the range of the sizes of radii that will maximize the fining efficiency for an enclosed finer. The height of the finer at its center is (203) and the total width is (201). A finer is considered an enclosed finer if the width (207) of the free surface (208) of glass is less than 75 percent of the width of the finer (201). A rectangular finer where the top is horizontal and the glass contacts the top over its entire width is considered an enclosed finer as shown in FIGS. 20B and 20C. FIG. 20A has the radius (204) of the bottom edge to side intersection equal to 20 percent of the height of glass (202) in the finer. FIG. 20A has the radius (205) of the top edge to side intersection equal to 20 percent of the height of glass (202) in the finer. FIG. 20B has the radius (204) of the bottom edge to side intersection equal to 50 percent of the height of glass (202) in the finer. FIG. 20B has the radius (205) of the top edge to side intersection equal to 50 percent of the height of glass (202) in the finer. In FIG. 20B, the radii are equal and comprise the extent of the edge of the finer. In FIG. 20C, the radius (205) of the top edge to side intersection is equal to 20 percent of the height of glass (202) in the finer and the radius (204) of the bottom edge to side intersection is equal to 50 percent of the height of glass (202) in the finer. Any combination of top and bottom radii within the 20 percent to 50 percent range would increase the efficiency of the finer relative to the quantity of platinum used.

Figure 21A:
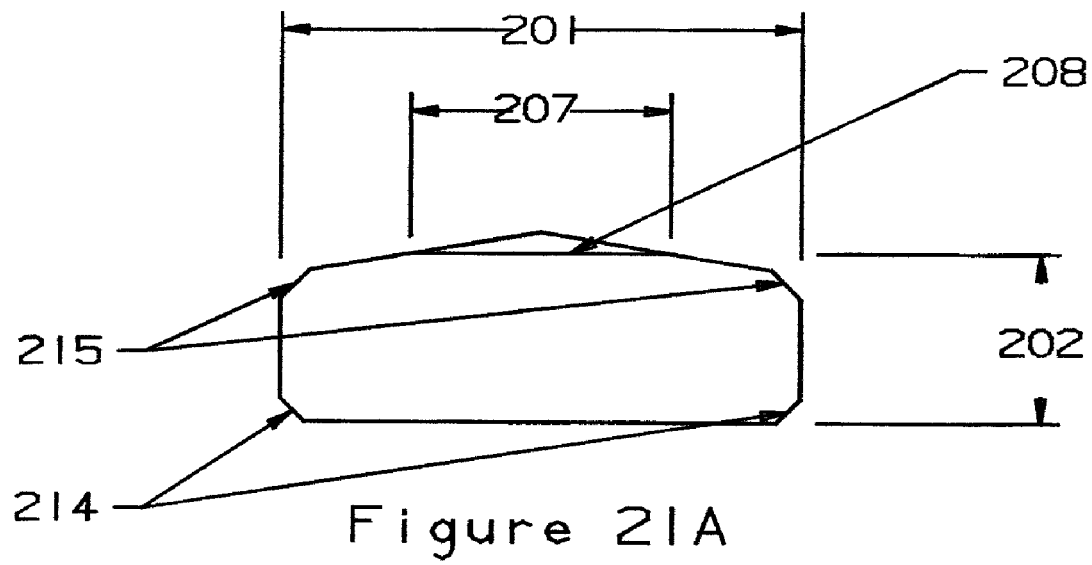
FIG. 21A shows one use of chamfers in a high aspect ratio enclosed finer.
Figure 21B:
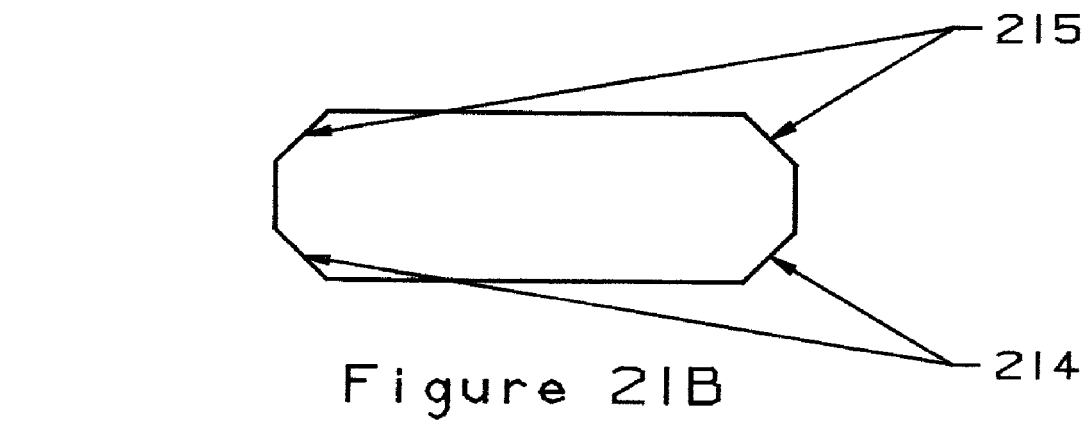
FIG. 21B shows another use of chamfers in a high aspect ratio enclosed finer.
Figure 21C:
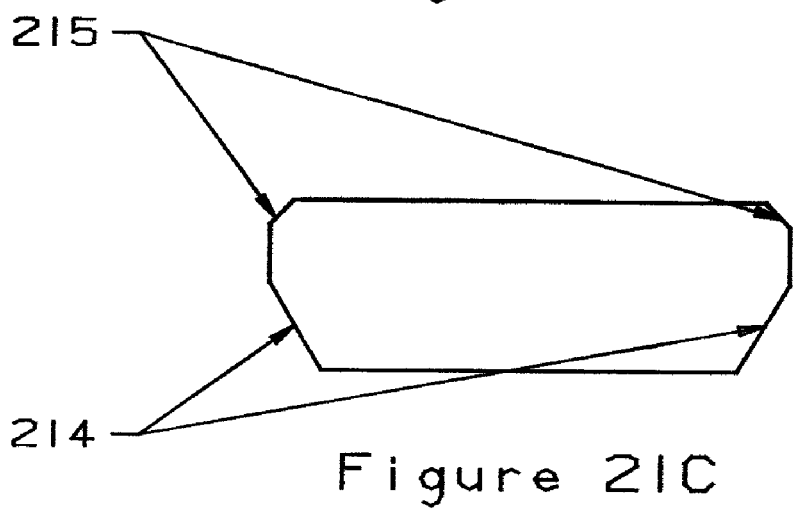
FIG. 21C shows another use of chamfers in a high aspect ratio enclosed finer.

FIGS. 21A, 21B, and 21C show the range of the sizes of chamfers that will maximize the fining efficiency for an enclosed finer. A finer will be considered an enclosed finer if the width (217) of the free surface (218) of glass is less than 75 percent of the width of the finer (219). A rectangular finer whereby the top is horizontal and the glass contacts the top over its entire width would be considered an enclosed finer. In FIG. 21A, the chamfer (211) of the bottom edge to side intersection is equal to 45 degree (°) by 14 percent of the height of the glass (202) in the finer, and the chamfer (213) of the top edge to side intersection is equal to 45° by 14 percent of the height of the glass (202) in the finer. In FIG. 21B, the chamfer (214) of the bottom edge to side intersection is equal to 45° by 30 percent of the height of the glass (202) in the finer, and the chamfer (215) of the top edge to side intersection is equal to 45° by 30 percent of the height of the glass (202) in the finer. The chamfers are equal in FIG. 21B. In FIG. 21C, the chamfer (213) of the top edge to side intersection is equal to 45° by 14 percent of the height of the glass (202) in the finer, and the chamfer (214) of the bottom edge to side intersection is equal to 60° by 30 percent of the height of the glass (202) in the finer. Any combination of top and bottom chamfers between 45° and 60° by 14 percent to 30 percent of the height of glass (202) in the finer increases the efficiency of the finer relative to the quantity of platinum used.

Figure 22A:
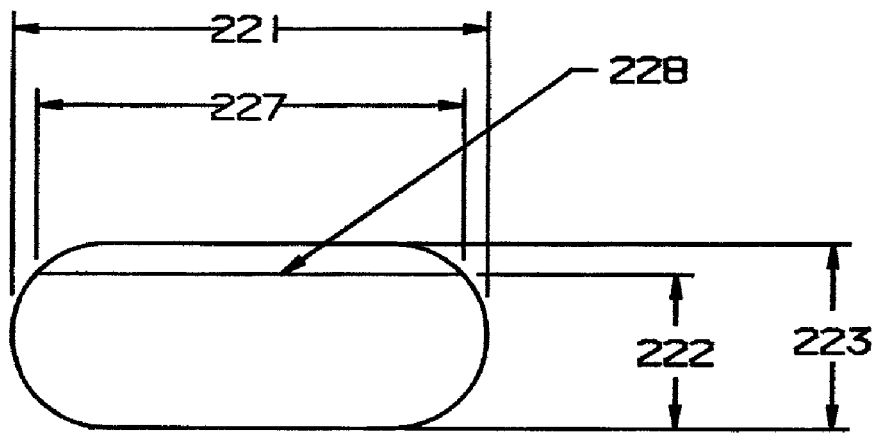
FIG. 22A shows one use of radii in a high aspect ratio free surface finer.
Figure 22B:
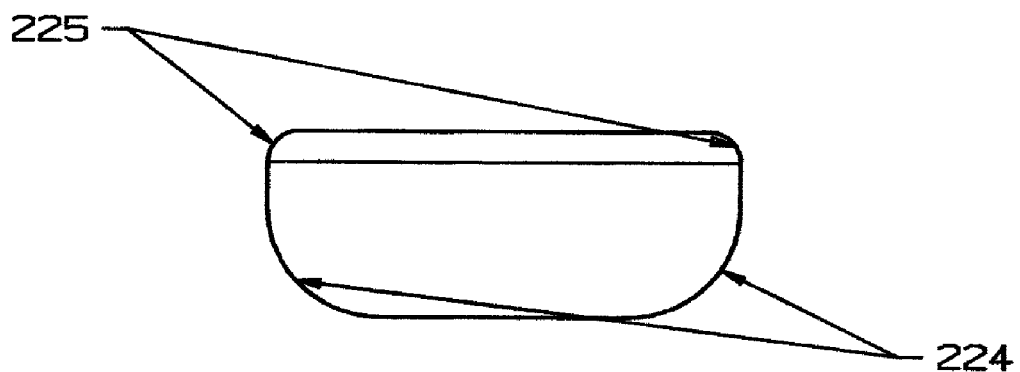
FIG. 22B shows another use of radii in a high aspect ratio free surface finer.
Figure 22C:
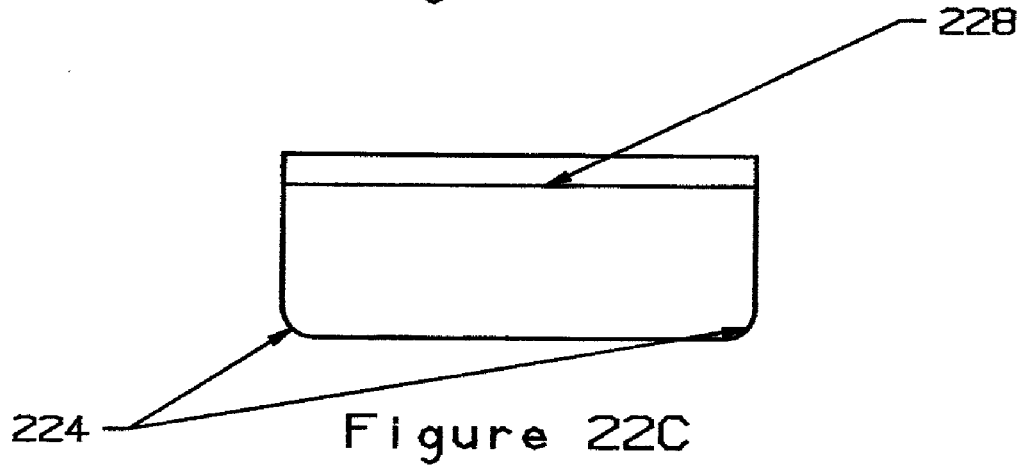
FIG. 22C shows another use of radii in a high aspect ratio free surface finer.

FIGS. 22A, 22B, and 22C show the range of the sizes of radii that maximizes the fining efficiency for a free surface finer. A finer is considered a free surface finer if the width (227) of the free surface (228) of glass is greater than 75 percent of the width of the finer (221). FIG. 22A shows a free surface finer with semi-circular sides where the top and bottom side radii (224) and (225) are equal to one half the height (223) of the finer cross-section. In FIG. 22B, the radius (224) of the bottom edge to side intersection is equal to 71 percent of the height of the glass (222) in the finer, and the radius (225) of the top edge to side intersection is equal to 20 percent of the height (223) of the finer. FIG. 22C has no radius at the top edge to side intersection of the finer. FIG. 22C has the radius (224) of the bottom edge to side intersection equal to 20 percent of the height of the glass (222) in the finer. Any combination of top radii within the 0 and 20 percent of the height of the finer and bottom radii within the 20 percent to 71 percent of the height of the glass in the finer increases the efficiency of the finer relative to the quantity of platinum used.

Figure 23A:
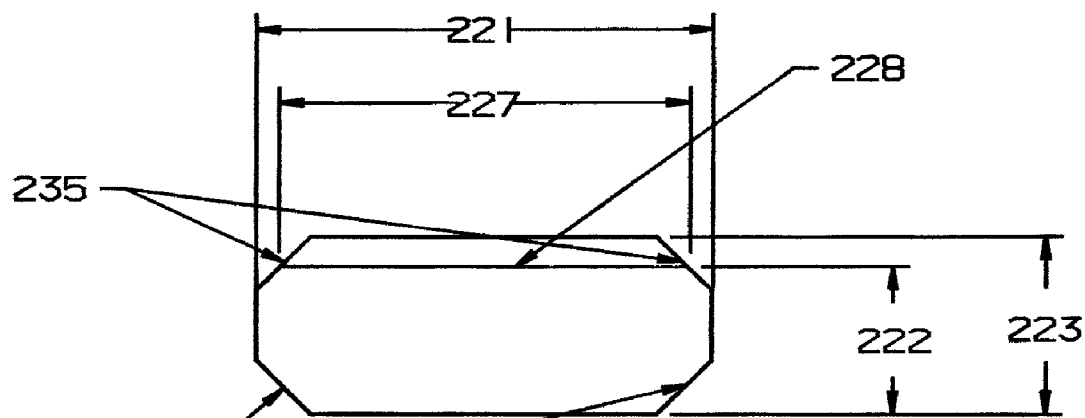
FIG. 23A shows one use of chamfers in a high aspect ratio free surface finer.
Figure 23B:
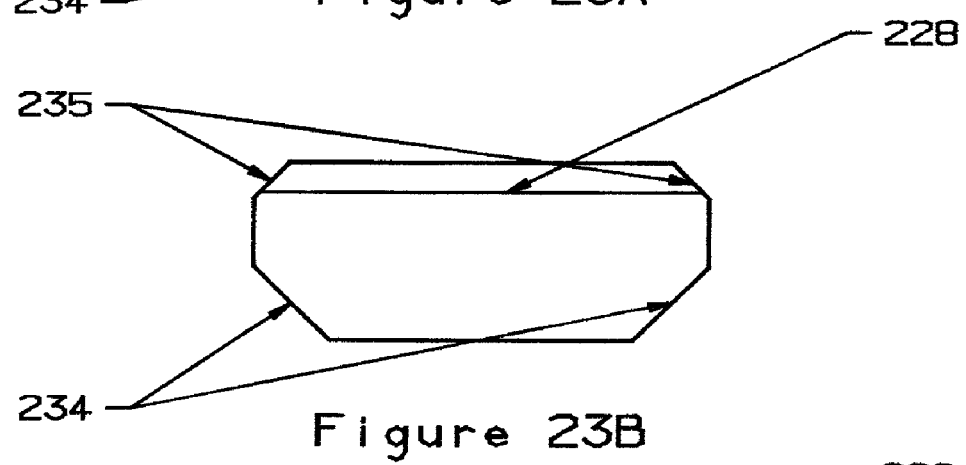
FIG. 23B shows another use of chamfers in a high aspect ratio free surface finer.
Figure 23C:
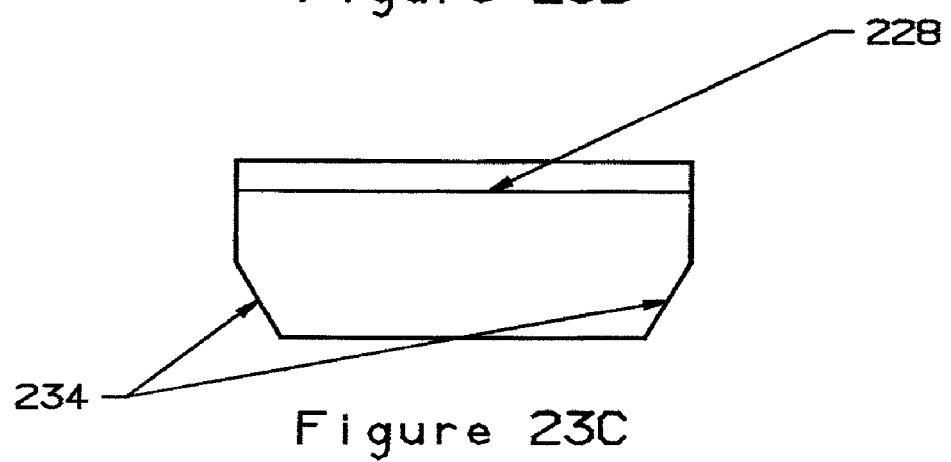
FIG. 23C shows another use of chamfers in a high aspect ratio free surface finer.

FIGS. 23A, 23B, and 23C show the range of the sizes of chamfers that maximize the fining efficiency for a free surface finer. A finer is considered a free surface finer if the width (227) of the free surface (228) of glass is greater than 75 percent of the width of the finer (221). In FIG. 23A, the chamfer (234) of the bottom edge to side intersection is equal to 45° by 30 percent of the height (223) of the finer and the chamfer (235) of the top edge to side intersection is equal to 45° by 30 percent of the height (223) of the finer. In FIG. 23B, the chamfer (234) of the bottom edge to side intersection is equal to 45° by 71 percent of the height of the glass (222) in the finer and the chamfer (235) of the top edge to side intersection is equal to 45° by 20 percent of the height (223) of the finer. FIG. 23C has no chamfer at the top edge to side intersection of the finer. FIG. 23C has the chamfer (234) of the bottom edge to side intersection to be equal to 60° by 30 percent of the height (232) of the finer. Any combination of top chamfers within the 45° to 60° and 20 to 30 percent of the height of the finer and bottom chamfers within the 45° to 60° by 30 percent to 71 percent of the height of the glass in the finer increases the efficiency of the finer relative to the quantity of platinum used.

Inverted Apex

FIGS. 24A through 24D illustrate embodiments of an inverted apex finer where the apex is pointed down (inverted) and the outside edges (244) are vertically the highest part of the finer cross-section. FIG. 25 is a view of a finer (251) with the cross-section similar to that in FIG. 24A. The glass enters the finer (251) at the inlet end (253). In these embodiments the seeds rise to the two outside edges and are dispersed to either a vent, which spans the entire top of the exit end (254) of the finer (251) or two separate vents (255) at the exit end (254) of the finer (251). This configuration is especially adaptable to a single central exit (254).

Figure 24A:
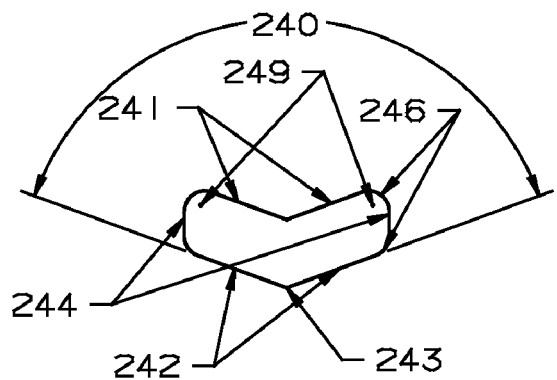
FIG. 24A shows a six sided finer cross-section with an inverted apex gable roof and radii at the ends in an embodiment of the present invention.
Figure 24B:
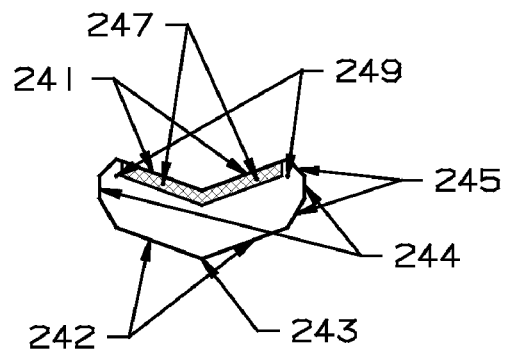
FIG. 24B shows a six sided finer cross-section with an inverted apex gable roof, fining ribs and chamfered ends in an embodiment of the present invention.
Figure 24C:
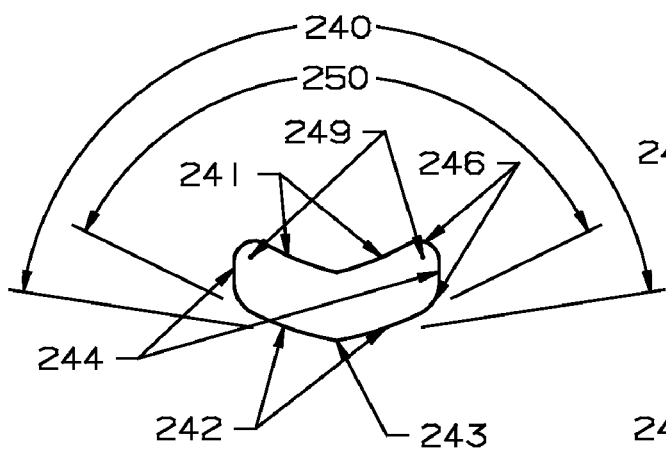
FIG. 24C shows a six sided finer cross-section with an inverted apex Gothic arch roof and radii at the ends in an embodiment of the present invention.
Figure 24D:
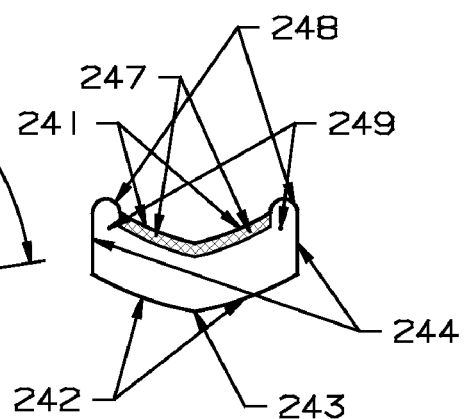
FIG. 24D shows a six sided finer cross-section with an inverted apex Gothic arch roof, fining ribs and corner vents at the ends in an embodiment of the present invention.
Figure 25:
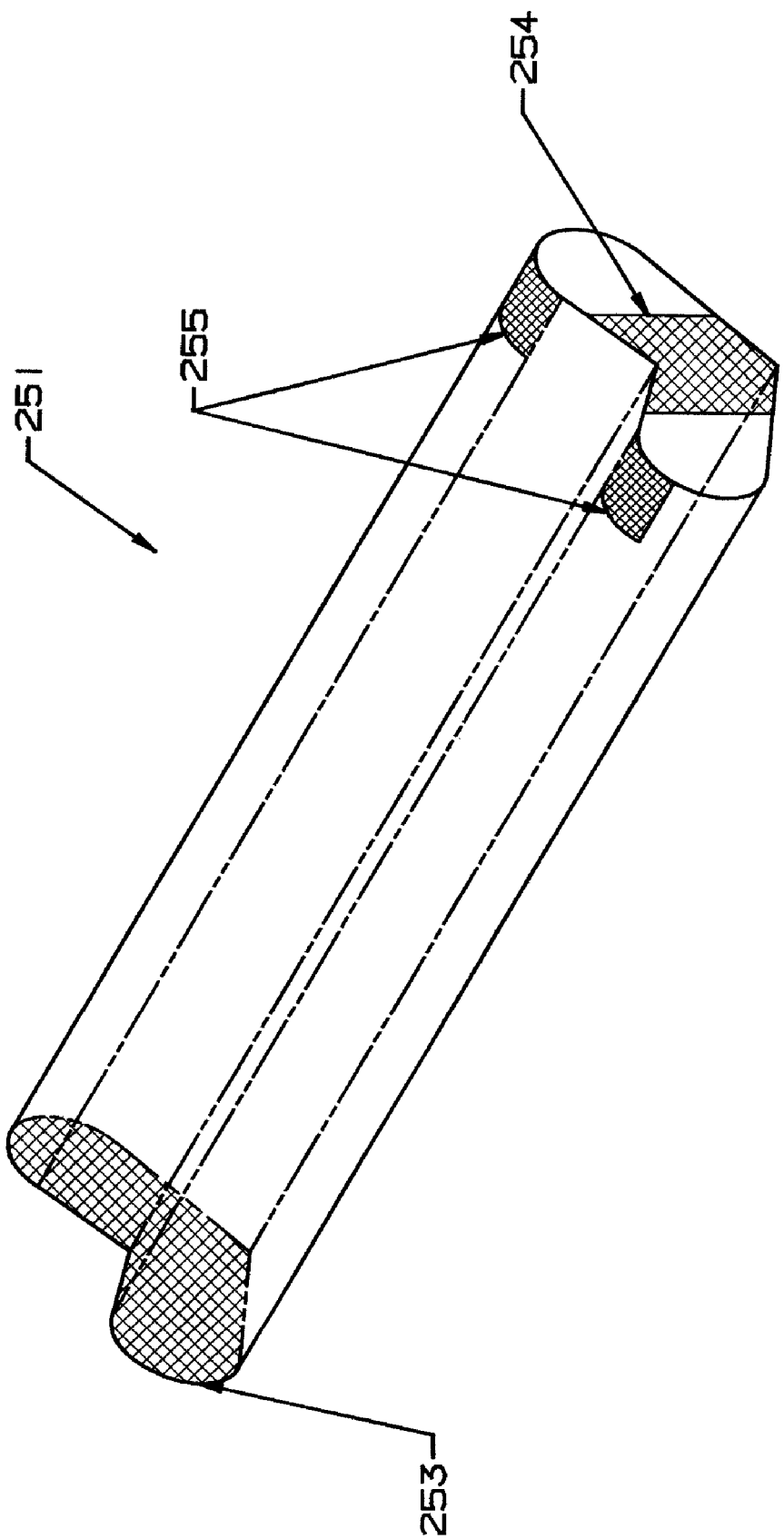
FIG. 25 shows an inverted apex gable roof finer with fully radiused ends.

FIG. 24A shows the straight bottom elements (242) with an obtuse angle (240) at the inverted apex (243). The top elements (241) are parallel to the bottom elements (242). The sides (244) are joined to the bottom and top by equal radii (246). FIG. 24B shows the straight bottom elements joined at the inverted apex (243). The top elements (241) are parallel to the bottom elements (242). The sides (244) are joined to the bottom and top by unequal chamfers (245). A fining rib (247), which is continuous across the top surface, ends at each upper outside corner (249) to allow the seeds to flow toward the vents (255). FIG. 24C shows curved bottom elements (242) with an obtuse angle (240) at the inverted apex (243), which has the form of an inverted gothic arch. The top elements (241) are equidistant from the bottom elements (242). The sides (244) are joined to the bottom and top by unequal radii (246). FIG. 24D shows curved bottom elements (242) joined at the inverted apex (243). The top elements (241) are equidistant from the bottom elements (242). The sides (244) are joined to the bottom elements (242) by an obtuse angle. The sides (244) are joined to the top elements (241) by corner vents (248), which conduct the seeds toward the exit end vents (255). A fining rib (247), which is continuous across the top surface, ends at each upper outside corner (249) to allow the seeds to flow in the corner vents (248) toward the exit end vents (255). A preferred embodiment of an inverted gabled roof finer has an obtuse included angle (240) of 140 degrees. Obtuse included angles (240) between 190 degrees and 90 degrees are also within the spirit of the present invention. A preferred embodiment of an inverted gothic arch roof finer has an apex obtuse included angle (240) of 160 degrees and an end obtuse included angle (250) of 130 degrees. Additional obtuse included angles, in the range of 178 degrees to 130 degrees for the apex obtuse included angle (240) and 160 degrees to 90 degrees for the end obtuse included angle (250), are also within the spirit of the present invention.

Multiple Cross-Sections

Figure 26:
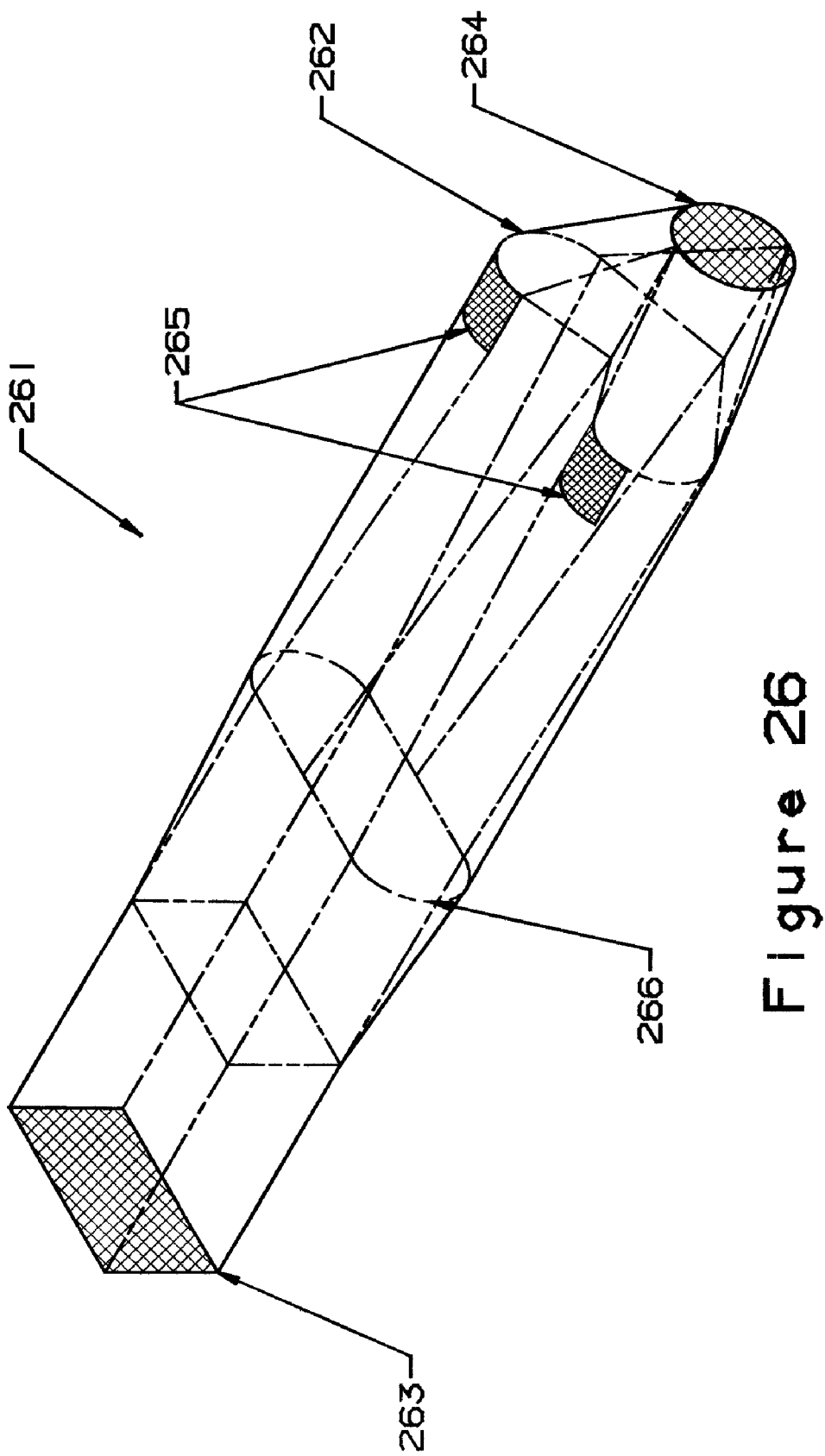
FIG. 26 shows a finer with multiple cross sections in an embodiment of the present invention.

All finer configurations previously discussed in the text of this invention have a single cross-section. FIG. 26 shows an example of a finer (261) with an inlet (263), and outlet (264), and two atmospheric vents (265) with multiple cross-sections. The finer (261) configuration has an inlet end (263) rectangular cross-section for a portion of the length of the finer (261), which transitions first to a rectangular cross-section with radiused ends (266), then to an inverted apex with radiused ends (262) and finally to a circular exit (264). The cross-sections in FIG. 26 also have different aspect ratios. The rectangular inlet (263) has an aspect ratio of 2. The rectangular cross-section with radiused ends (261) and the inverted apex with radiused ends cross-section (262) each have an aspect ratio of 3. The circular exit has an aspect ratio of 1. The combination of cross-sections and aspect ratios in FIG. 26 is just an example of how the cross-sections and aspect ratios described herein may be combined in a multiple cross-section finer.

Applications of the Present Invention

The embodiments of the present invention can be applied to glass production processes in various ways depending on the manufacturing economics. The choice can be made to either increase the production of salable product or to save capital expense. Glass production losses from inclusions (seeds, seeds and blisters) are often in the range of 1 to 5 percent. If the production losses are significant, an increase in salable product would be obtained by implementing a high aspect ratio finer containing the same content of platinum as the present prior art finer. If the losses from inclusions are not significant, a shorter finer using approximately one half the platinum would save capital investment and yield the same inclusion quality.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A finer for removing seeds from molten glass, comprising:

a plurality of walls, wherein the walls that contain the molten glass in the finer are fabricated from a precious metal selected from the group consisting of platinum or a platinum alloy, and the walls define an elongated tube-shaped channel terminating at an inlet end and an outlet end;

a glass inlet connected to the terminating end of the inlet end of the channel for receiving molten glass;

an outlet connected to the terminating end of the outlet end of the channel to allow molten glass to exit the finer for further processing; and at least one cross-sectional shape having a width to height ratio substantially greater than 1.00;

wherein the finer is operatively connected to a vent for releasing the seeds at a top of the finer to atmosphere, wherein the cross-sectional shape is selected from the group consisting of:

a) a six sided cross-section with a gabled roof;
b) a six sided cross-section with a gabled roof and a gabled bottom comprising corners that are chamfered;
c) a six sided cross-section with a gabled roof and a gabled bottom comprising corners that are curved;
d) a six sided cross-section with a gothic arch roof and a gothic arch bottom;
e) a six sided cross-section with a gothic arch roof and a gothic arch bottom comprising corners that are chamfered;
f) a six sided cross-section with a gothic arch roof and a gothic arch bottom comprising corners that are curved;
g) a six sided cross-section with an inverted gabled roof and an inverted gabled bottom;
h) a six sided cross-section with an inverted gabled roof and an inverted gabled bottom comprising corners that are chamfered;
i) a six sided cross-section with an inverted gabled roof and an inverted gabled bottom comprising corners that are curved;
j) a six sided cross-section with an inverted gothic arch roof and an inverted gothic arch bottom;
k) a six sided cross-section with an inverted gothic arch roof and an inverted gothic arch bottom comprising corners that are chamfered;
l) a six sided cross-section with an inverted gothic arch roof and an inverted gothic arch bottom comprising corners that are curved;
m) a five sided cross-section with a gabled roof;
n) a five sided cross-section with a gabled roof comprising corners that are chamfered;
o) a five sided cross-section with a gabled roof comprising corners that are curved;
p) a five sided cross-section with a gothic arch roof;
q) a five sided cross-section with a gothic arch roof comprising corners that are chamfered;
r) a five sided cross-section with a gothic arch roof comprising corners that are curved;

s) a seven sided cross-section with an inverted gabled roof, an inverted gabled bottom section and a horizontal bottom section;
t) a seven sided cross-section with an inverted gabled roof, an inverted gabled bottom section and a horizontal bottom section comprising corners that are chamfered;
u) a seven sided cross-section with an inverted gabled roof, an inverted gabled bottom section and a horizontal bottom section comprising corners that are curved;
v) a seven sided cross-section with an inverted gothic arch roof, an inverted gabled bottom section and a horizontal bottom section;
w) a seven sided cross-section with an inverted gothic arch roof, an inverted gothic arch bottom section and a horizontal bottom section comprising corners that are chamfered;
x) a seven sided cross-section with an inverted gothic arch roof, an inverted gothic arch bottom and a horizontal bottom section comprising corners that are curved; and
y) any combination of two or more of cross-sections a) through x).

2. The finer of claim 1, wherein the width to height ratio is 2.0 or greater.

3. The finer of claim 1, wherein the width to height ratio is approximately 6.00.

4. The finer of claim 1, wherein the cross-sectional shape is selected from the group consisting of:
a) a substantially rectangular cross-section comprising corners that are chamfered; and
b) a substantially rectangular cross-section comprising corners that are curved.

5. The finer of claim 4, wherein at least one chamfered corner measured from a top edge to a side intersection of the rectangular cross section has an angle ranging from 45° to 60° with respect to horizontal and 0 to 30 percent of a height of the finer.

6. The finer of claim 4, wherein at least one chamfered corner measured from a bottom edge to a side intersection of the rectangular cross section has an angle ranging from 45° to 60° with respect to horizontal and 14 percent to 71 percent of a height of glass in the finer.

7. The finer of claim 4, wherein at least one curved corner measured from a top edge to a side intersection of the rectangular cross section is equal to approximately 20 to 71 percent of a height of glass in the finer.

8. The finer of claim 4, wherein at least one curved corner measured from a bottom edge a side intersection of the rectangular cross section is equal to approximately 20 to 71 percent of a height of glass in the finer.

9. The finer of claim 4, wherein at least one curved end of the rectangular cross section is a semi-ellipse where a range of a ratio of minor semi axis to major semi axis is 1.0 to 0.4.

10. The finer of claim 1, further comprising at least one fining rib positioned perpendicular to a direction of glass flow within the finer to control the migration of seeds within the finer.

11. The finer of claim 1, further comprising at least one roof vent to control the migration of seeds within the finer.

12. The finer of claim 11, wherein the roof vent comprises a plurality of roof vents to control a migration of seeds within the finer.

13. The finer of claim 1, wherein at least one chamfered corner measured from a top edge to a side intersection has an angle ranging from 45° to 60° with respect to the horizontal and 0 to 30 percent of a height of the finer.

14. The finer of claim 1, wherein at least one chamfered corner measured from a bottom edge to a side intersection has an angle ranging from 45° to 60° with respect to the horizontal and 14 percent to 71 percent of a height of glass in the finer.

15. The finer of claim 1, wherein at least one curved corner measured from a top edge to a side intersection is equal to approximately 0 to 50 percent of a height of the finer.

16. The finer of claim 1, wherein at least one curved corner measured from a bottom edge a side intersection is equal to approximately 20 to 71 percent of a height of glass in the finer.

17. The finer of claim 1, wherein at least one curved end is a semi-ellipse where the range of a ratio of minor semi axis to major semi axis is 1.0 to 0.4.

18. The finer of claim 1, wherein an included angle of a gabled roof is between 190 and 90 degrees.

19. The finer of claim 18, wherein the included angle of the gabled roof is between 180 and 120 degrees.

20. The finer of claim 1, wherein an included angle of an apex of a gothic arch roof is between 178 and 130 degrees.

21. The finer of claim 20, wherein the included angle of the apex of the gothic arch roof is between 170 and 150 degrees.

22. The finer of claim 1, wherein an included angle of the ends of a gothic arch roof is between 170 and 90 degrees.

23. The finer of claim 22, wherein the included angle of the ends of the gothic arch roof is between 160 and 140 degrees.

24. The finer of claim 1, wherein the walls comprise a top wall, wherein a top surface of the glass in the finer does not make direct contact with the top wall of the finer over at least a portion of a length of the finer.

25. The finer in claim 24, wherein any portion of the top wall that is not in direct contact with the glass is constructed of a material other than a precious metal.

26. The finer of claim 1, further comprising at least one fining rib positioned perpendicular to a direction of glass flow within the finer to control a migration of seeds within the finer.

27. The finer of claim 1, further comprising at least one roof vent to control a migration of seeds within the finer.

28. The finer of claim 27, wherein the roof vent comprises a plurality of roof vents to control the migration of seeds within the finer.

29. The finer of claim 1, further comprising at least one fining rib positioned at an acute angle to a direction of glass flow within the finer to control a migration of seeds within the finer.

30. The finer of claim 29, wherein the angle of the fining rib with respect to the direction of glass flow within the finer is between 5 and 85 degrees.

31. The finer of claim 30, wherein the angle of the fining rib with respect to the direction glass flow within the finer is between 50 and 70 degrees.

32. The finer of claim 1, wherein the finer comprises a first cross-sectional shape selected from the group consisting of cross-sections a) through x) and at least one second cross-sectional shape selected from the group consisting of:
y) a rectangular cross-section;
z) a rectangular cross-section comprising corners that are chamfered;
aa) a rectangular cross-section comprising corners that are curved;
ab) a circular cross section;
ac) an elliptical cross-section;
ad) a cross-section comprising a curved top, a curved bottom parallel to the curved top, and two curved sides, wherein the curved bottom and the curved top are the same length and are longer than the curved sides, wherein each of the curved sides are the same length and connects the curved top to the curved bottom at one end;

ae) a horizontally oblong cross-section comprising a curved top and a curved bottom not parallel to the curved top, connected at each end by two curved sides, wherein any of the curved top, the curved bottom or the curved sides are comprised of curved and straight sections and may be shaped to be convex outward or convex inward; and af) a square cross-section.

33. A finer for removing seeds from molten glass of claim 1, comprising:
- a plurality of walls defining an elgonated channel terminating at an inlet end and an outlet end, wherein the walls that contain the molten glass in the finer are fabricated from a precious metal selected from the group consisting of platinum and a platinum alloy;
- a glass inlet for receiving molten glass connected to the terminating end of the inlet end;
- an outlet to allow molten glass to exit the finer for further processing connected to the terminating end of the outlet end;
- a first cross-sectional shape across a first portion of the finer, having a width to height ratio substantially greater than 1.00;
- a second cross-sectional shape across a second portion of the finer, having a width to height ratio substantially greater than 1.00, wherein the second cross-sectional shape is different than the first cross-sectional shape; and
- a vent for releasing the seeds at a top of the finer to atmosphere.

34. The finer of claim 33, wherein the first cross-sectional shape has a different width to height ratio than the second cross-sectional shape.

35. The finer of claim 33, wherein the first cross-sectional shape has a different width to height ratio than the second cross-sectional shape.

36. The finer of claim 32, wherein the first cross-sectional shape has a different width to height ratio than the second cross-sectional shape.

37. The finer of claim 33, wherein the first cross-sectional shape has a different width to height ratio than the second cross-sectional shape.

38. A finer for removing seeds from molten glass of claim 1, comprising:
- a plurality of walls, wherein the walls that contain the molten glass in the finer are fabricated from a precious metal selected from the group consisting of platinum and a platinum alloy;
- a glass inlet for receiving molten glass;
- an outlet to allow molten glass to exit the finer for further processing;
- a first cross-sectional shape across a first portion of the finer, having a first width to height ratio substantially greater than 1.00;
- a second cross-sectional shape across a second portion of the finer, having a second width to height ratio substantially greater than 1.00, wherein the first width to height ratio is different from the second width to height ratio; and
- a vent for releasing the seeds at a top of the finer to atmosphere.

39. A finer of claim 1, wherein the outlet end of the channel is lower than the inlet end of the channel such that the molten glass can flow from the inlet end to the outlet end due to gravity.

* * * * *